United States Patent
Wang et al.

(10) Patent No.: US 7,907,749 B2
(45) Date of Patent: Mar. 15, 2011

(54) MULTI-STAGE WATERMARKING PROCESS AND SYSTEM

(75) Inventors: Xin Wang, Los Angeles, CA (US); Steve Atsushi Okamoto, Torrance, CA (US); Russell Robert Lear, Torrance, CA (US); Nancy Lynn Ishigo, Torrance, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 0 days.

(21) Appl. No.: 12/559,879

(22) Filed: Sep. 15, 2009

(65) Prior Publication Data

US 2010/0002907 A1    Jan. 7, 2010

Related U.S. Application Data

(63) Continuation of application No. 11/209,647, filed on Aug. 24, 2005, now Pat. No. 7,609,848, which is a continuation of application No. 11/142,256, filed on Jun. 2, 2005, now Pat. No. 7,184,571, which is a continuation of application No. 09/749,895, filed on Dec. 29, 2000, now Pat. No. 6,912,294.

(51) Int. Cl.
*G06K 9/00* (2006.01)
*G06K 15/00* (2006.01)
*G06F 21/00* (2006.01)

(52) U.S. Cl. ............ 382/100; 358/1.18; 705/51; 705/57
(58) Field of Classification Search .................. 382/100, 382/232, 240; 380/51, 54, 210, 252, 287; 370/522–529; 358/3.28, 1.18, 2.28; 713/176, 713/179; 705/51, 53, 57, 59, 80; 283/72, 74–81, 113, 901, 902

See application file for complete search history.

(56) References Cited

U.S. PATENT DOCUMENTS

| | | | |
|---|---|---|---|
| 3,263,158 | A | 7/1966 | Janis |
| 3,609,697 | A | 9/1971 | Blevins et al. |
| 3,790,700 | A | 2/1974 | Callais et al. |
| 3,798,605 | A | 3/1974 | Feist |
| 4,159,468 | A | 6/1979 | Barnes et al. |
| 4,200,700 | A | 4/1980 | Mäder |
| 4,220,991 | A | 9/1980 | Hamano et al. |
| 4,278,837 | A | 7/1981 | Best |
| 4,323,921 | A | 4/1982 | Guillou |
| 4,361,851 | A | 11/1982 | Asip et al. |

(Continued)

FOREIGN PATENT DOCUMENTS

BR    9810967 A    10/2001

(Continued)

OTHER PUBLICATIONS

European Search Report Dated Dec. 22, 2003.

(Continued)

*Primary Examiner* — Abolfazl Tabatabai
(74) *Attorney, Agent, or Firm* — Marc S. Kaufman; Stephen M. Hertzler; Reed Smith LLP

(57) ABSTRACT

A multi-stage watermarking system and process that creates a watermark specification which describes how to generate a watermark, generates a template specification which describes how to merge the watermark into a target document, generates the watermark based on the watermark specification, and merges the watermark into the target document based on the template specification to provide a watermarked document.

20 Claims, 12 Drawing Sheets

U.S. PATENT DOCUMENTS

| | | |
|---|---|---|
| 4,423,287 A | 12/1983 | Zeidler |
| 4,429,385 A | 1/1984 | Cichelli et al. |
| 4,442,486 A | 4/1984 | Mayer |
| 4,529,870 A | 7/1985 | Chaum |
| 4,558,176 A | 12/1985 | Arnold et al. |
| 4,593,376 A | 6/1986 | Volk |
| 4,614,861 A | 9/1986 | Pavlov et al. |
| 4,621,321 A | 11/1986 | Boebert et al. |
| 4,644,493 A | 2/1987 | Chandra et al. |
| 4,658,093 A | 4/1987 | Heilman |
| 4,713,753 A | 12/1987 | Beobert et al. |
| 4,736,422 A | 4/1988 | Mason |
| 4,740,890 A | 4/1988 | William |
| 4,796,220 A | 1/1989 | Wolfe |
| 4,816,655 A | 3/1989 | Musyck et al. |
| 4,817,140 A | 3/1989 | Chandra et al. |
| 4,827,508 A | 5/1989 | Shear |
| 4,868,376 A | 9/1989 | Lessin et al. |
| 4,888,638 A | 12/1989 | Bohn |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,164 A | 10/1991 | Elmer et al. |
| 5,103,476 A | 4/1992 | Waite et al. |
| 5,129,083 A | 7/1992 | Cutler et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,174,641 A | 12/1992 | Lim |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,287,408 A | 2/1994 | Samson |
| 5,291,596 A | 3/1994 | Mita |
| 5,293,422 A | 3/1994 | Loiacono |
| 5,301,231 A | 4/1994 | Abraham et al. |
| 5,311,591 A | 5/1994 | Fischer |
| 5,319,705 A | 6/1994 | Halter et al. |
| 5,335,275 A | 8/1994 | Millar et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Bandford |
| 5,381,526 A | 1/1995 | Ellson |
| 5,386,369 A | 1/1995 | Christiano |
| 5,390,297 A | 2/1995 | Barber et al. |
| 5,394,469 A | 2/1995 | Nag et al. |
| 5,410,598 A * | 4/1995 | Shear .......................... 705/53 |
| 5,412,717 A | 5/1995 | Fischer |
| 5,414,852 A | 5/1995 | Kramer et al. |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniete |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,485,577 A | 1/1996 | Eyer et al. |
| 5,499,298 A | 3/1996 | Narasimhalu et al. |
| 5,502,766 A | 3/1996 | Boebert et al. |
| 5,504,814 A | 4/1996 | Miyahara |
| 5,504,816 A | 4/1996 | Hamilton et al. |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,535,276 A | 7/1996 | Ganesan |
| 5,539,735 A | 7/1996 | Moskowitz |
| 5,553,143 A | 9/1996 | Ross et al. |
| 5,557,678 A | 9/1996 | Ganesan |
| 5,563,946 A | 10/1996 | Cooper et al. |
| 5,564,038 A | 10/1996 | Grantz et al. |
| 5,568,552 A | 10/1996 | Davis |
| 5,619,570 A | 4/1997 | Tsutsui |
| 5,621,797 A | 4/1997 | Rosen |
| 5,625,690 A | 4/1997 | Michel et al. |
| 5,629,980 A | 5/1997 | Stefik et al. |
| 5,633,932 A | 5/1997 | Davis et al. |
| 5,634,012 A * | 5/1997 | Stefik et al. .................... 705/39 |
| 5,636,346 A | 6/1997 | Saxe |
| 5,638,443 A | 6/1997 | Stefik et al. |
| 5,638,513 A | 6/1997 | Ananda |
| 5,649,013 A | 7/1997 | Stuckey et al. |
| 5,655,077 A | 8/1997 | Jones et al. |
| 5,708,709 A | 1/1998 | Rose |
| 5,708,717 A | 1/1998 | Alasia |
| 5,715,403 A | 2/1998 | Stefik |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,745,879 A | 4/1998 | Wyman |
| 5,748,783 A | 5/1998 | Rhoads |
| 5,757,907 A | 5/1998 | Cooper et al. |
| 5,761,686 A | 6/1998 | Bloomberg |
| 5,764,807 A | 6/1998 | Pearlman et al. |
| 5,765,152 A | 6/1998 | Erickson |
| 5,768,426 A | 6/1998 | Rhoads |
| 5,787,172 A | 7/1998 | Arnold |
| 5,790,677 A | 8/1998 | Fox et al. |
| 5,812,664 A | 9/1998 | Bernobich et al. |
| 5,825,876 A | 10/1998 | Peterson |
| 5,825,879 A | 10/1998 | Davis |
| 5,825,892 A | 10/1998 | Braudaway et al. |
| 5,838,792 A | 11/1998 | Ganesan |
| 5,848,154 A | 12/1998 | Nishio et al. |
| 5,848,378 A | 12/1998 | Shelton et al. |
| 5,850,443 A | 12/1998 | Van Oorschot et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,933,498 A | 8/1999 | Schneck et al. |
| 5,940,504 A | 8/1999 | Griswold |
| 5,943,422 A | 8/1999 | Van Wie et al. |
| 5,949,876 A | 9/1999 | Ginter et al. |
| 5,982,891 A | 11/1999 | Ginter et al. |
| 5,987,134 A | 11/1999 | Shin et al. |
| 5,999,624 A | 12/1999 | Hopkins |
| 5,999,949 A | 12/1999 | Crandall |
| 6,006,332 A | 12/1999 | Rabne et al. |
| 6,020,882 A | 2/2000 | Kinghorn et al. |
| 6,047,067 A | 4/2000 | Rosen |
| 6,073,234 A | 6/2000 | Kigo et al. |
| 6,091,777 A | 7/2000 | Guetz et al. |
| 6,112,181 A | 8/2000 | Shear et al. |
| 6,112,239 A | 8/2000 | Kenner et al. |

| | | | |
|---|---|---|---|
| 6,115,471 A | 9/2000 | Oki et al. | |
| 6,135,646 A | 10/2000 | Kahn et al. | |
| 6,138,119 A | 10/2000 | Hall et al. | |
| 6,141,754 A | 10/2000 | Choy | |
| 6,157,719 A | 12/2000 | Wasilewski et al. | |
| 6,157,721 A | 12/2000 | Shear et al. | |
| 6,169,976 B1 | 1/2001 | Colosso | |
| 6,185,683 B1 | 2/2001 | Ginter et al. | |
| 6,189,037 B1 | 2/2001 | Adams et al. | |
| 6,189,146 B1 | 2/2001 | Misra et al. | |
| 6,209,092 B1 | 3/2001 | Linnartz | |
| 6,216,112 B1 | 4/2001 | Fuller et al. | |
| 6,219,652 B1 * | 4/2001 | Carter et al. | 705/59 |
| 6,226,618 B1 | 5/2001 | Downs et al. | |
| 6,233,684 B1 * | 5/2001 | Stefik et al. | 713/176 |
| 6,236,971 B1 | 5/2001 | Stefik et al. | |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,278,781 B1 | 8/2001 | Rhoads | |
| 6,292,569 B1 | 9/2001 | Shear et al. | |
| 6,301,660 B1 | 10/2001 | Benson | |
| 6,307,939 B1 | 10/2001 | Vigarie | |
| 6,327,652 B1 | 12/2001 | England et al. | |
| 6,330,670 B1 | 12/2001 | England et al. | |
| 6,345,256 B1 | 2/2002 | Milsted et al. | |
| 6,353,888 B1 | 3/2002 | Kakehi et al. | |
| 6,363,488 B1 | 3/2002 | Ginter et al. | |
| 6,389,151 B1 | 5/2002 | Carr et al. | |
| 6,389,402 B1 * | 5/2002 | Ginter et al. | 705/51 |
| 6,397,333 B1 | 5/2002 | Söhne et al. | |
| 6,401,211 B1 | 6/2002 | Brezak, Jr. et al. | |
| 6,405,369 B1 | 6/2002 | Tsuria | |
| 6,424,717 B1 | 7/2002 | Pinder et al. | |
| 6,424,947 B1 | 7/2002 | Tsuria et al. | |
| 6,487,659 B1 | 11/2002 | Kigo et al. | |
| 6,516,052 B2 | 2/2003 | Voudouris | |
| 6,516,413 B1 | 2/2003 | Aratani et al. | |
| 6,523,745 B1 | 2/2003 | Tamori | |
| 6,611,607 B1 * | 8/2003 | Davis et al. | 382/100 |
| 6,614,914 B1 * | 9/2003 | Rhoads et al. | 382/100 |
| 6,625,780 B1 | 9/2003 | Charbon et al. | |
| 6,796,555 B1 | 9/2004 | Blahut | |
| 2001/0009026 A1 | 7/2001 | Terao et al. | |
| 2001/0011276 A1 | 8/2001 | Durst, Jr. et al. | |
| 2001/0014206 A1 | 8/2001 | Artigalas et al. | |
| 2001/0037467 A1 | 11/2001 | O'Toole, Jr. et al. | |
| 2001/0039659 A1 | 11/2001 | Simmons et al. | |
| 2002/0001387 A1 | 1/2002 | Dillon | |
| 2002/0035618 A1 | 3/2002 | Mendez et al. | |
| 2002/0044658 A1 | 4/2002 | Wasilewski et al. | |
| 2002/0056118 A1 | 5/2002 | Hunter et al. | |
| 2002/0069282 A1 | 6/2002 | Reisman | |
| 2002/0099948 A1 | 7/2002 | Kocher et al. | |
| 2002/0127423 A1 | 9/2002 | Kayanakis | |
| 2003/0097567 A1 | 5/2003 | Terao et al. | |
| 2004/0052370 A1 | 3/2004 | Katznelson | |
| 2004/0172552 A1 | 9/2004 | Boyles et al. | |

FOREIGN PATENT DOCUMENTS

| | | |
|---|---|---|
| EP | 0 067 556 B1 | 12/1982 |
| EP | 0 084 441 | 7/1983 |
| EP | 0 180 460 | 5/1986 |
| EP | 0 257 585 A2 | 3/1988 |
| EP | 0 262 025 A2 | 3/1988 |
| EP | 0 332 304 A2 | 9/1989 |
| EP | 0 332 707 | 9/1989 |
| EP | 0 393 806 A2 | 10/1990 |
| EP | 0 450 841 A2 | 10/1991 |
| EP | 0 529 261 A2 | 3/1993 |
| EP | 0 613 073 A1 | 8/1994 |
| EP | 0 651 554 | 5/1995 |
| EP | 0 668 695 | 8/1995 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0 725 376 | 8/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 862 318 A2 | 9/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 103 922 A2 | 5/2001 |
| GB | 1483282 | 8/1977 |
| GB | 2022969 A | 12/1979 |
| GB | 2 136 175 | 9/1984 |
| GB | 2 236 604 | 4/1991 |
| GB | 2236604 A | 4/1991 |
| GB | 2309364 A | 7/1997 |
| GB | 2316503 A | 2/1998 |
| GB | 2354102 A | 3/2001 |
| JP | 3063717 A | 3/1991 |
| JP | 5-100939 | 4/1993 |
| JP | 5168039 A2 | 7/1993 |
| JP | 6131371 A | 5/1994 |
| JP | 7-36768 | 2/1995 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 | 11/1992 |
| WO | WO 92/20022 A1 | 11/1992 |
| WO | WO 93/01550 | 1/1993 |
| WO | WO 93/01550 A1 | 1/1993 |
| WO | WO 93/11480 A1 | 6/1993 |
| WO | WO 94/03003 A1 | 2/1994 |
| WO | WO 96/13814 A1 | 5/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 98/09209 A1 | 3/1998 |
| WO | WO 98/10561 A1 | 3/1998 |
| WO | WO 98/11690 A1 | 3/1998 |
| WO | WO 98/19431 A1 | 5/1998 |
| WO | WO 98/43426 A1 | 10/1998 |
| WO | WO 98/45768 A1 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/36876 | 7/1999 |
| WO | WO 99/48296 A1 | 9/1999 |
| WO | WO 99/49615 | 9/1999 |
| WO | WO 99/60461 A1 | 11/1999 |
| WO | WO 99/60750 A2 | 11/1999 |
| WO | WO 00/04727 A2 | 1/2000 |
| WO | WO 00/05898 A2 | 2/2000 |
| WO | WO 00/46994 A1 | 8/2000 |
| WO | WO 00/59152 | 10/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | WO 01/37209 A1 | 5/2001 |
| WO | WO 01/63528 | 8/2001 |
| WO | WO 2004/034223 A2 | 4/2004 |
| WO | WO 2004/103843 | 12/2004 |

OTHER PUBLICATIONS

Blaze et al, "Divertible Protocols and Atomic Proxy Cryptography" 1998 Advances in Cryptography—Euro Crypt International Conference on the Theory and Application of Crypto Techniques, Springer Verlag, DE.

Blaze et al, "Atomic Proxy Cryptography" DRAFT (Online) (Nov. 2, 1997) XP002239619 Retrieved from the Internet.
No Author, "Capability- and Object-Based Systems Concepts," Capability-Based Computer Systems, pp. 1-19 (no date).
Cox, "Superdistribution" Wired Magazine (Sep. 1994) XP002233405 URL:http://www.wired.com/wired/archive/2.09/superdis_pr.html>.
Dunlop et al, Telecommunications Engineering, pp. 346-352 (1984).
Elgamal, "A Public Key Cryptosystem and a Signature Scheme Based on Discrete Logarithms," IEEE Transactions on Information Theory IT-31(4):469-472 (Jul. 1985).
Gheorghiu et al., "Authorization for Metacomputing Applications" (no date).
Iannella, ed., Open Digital Rights Language (ODRL), pp. 1-31 (Nov. 21, 2000).
Kahle, wais.concepts.txt, Wide Area Information Server Concepts, Thinking Machines Version 4, Draft, pp. 1-18 (Nov. 3, 1989).
Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.
Kahn et al, "The Digital Library Project, vol. 1: The World of Knowbots (DRAFT), An Open Architecture for a Digital Library System and a Plan for its Development," Corporation for National Research Initiatives, pp. 1-48 (Mar. 1988).
Kohl et al, Network Working Group Request for Comments: 1510, pp. 1-112 (Sep. 1993).
Lee et al, CDMA Systems Engineering Handbook (1998) [excerpts but not all pages numbered].
Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, Berlin, Germany, Springer-Verlag, Germany), XP008016393 ISBN: 3-540-63232-8.
Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.
Microsoft Word, Users Guide, Version 6.0, pp. 487-489, 549-555, 560-564, 572-575, 599-613, 616-631 (1993).
Ojanperä and Prasad, eds., Wideband CDMA for Third Generation Mobile Communications (1998) [excerpts but not all pages numbered].
Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).
Raggett, (Hewlett Packard), "HTML+(Hypertext markup language)," pp. 1-31 (Jul. 12, 1993) URL:http://citeseer.ist.psu.edu/correct/340709.
Samuelson et al, "Intellectual Property Rights for Digital Library and Hypertext Publishing Systems: An Analysis of Xanadu," Hypertext '91 Proceedings, pp. 39-50 (Dec. 1991).
No Author, "Softlock Services Introduces . . . Softlock Services" Press Release (Jan. 28, 1994).
No Author, "Appendix III—Compatibility with HTML," No Title, pp. 30-31 (no date).
No Editor, No Title, Dictionary pages, pp. 469-472, 593-594 (no date).
Benoit, Digital Television MPEG-1, MPEG-2 and Principles of the DVB System, pp. 75-80, 116-121 (no date).
Benoit, Digital Television MPEG-1, MPEG-2 and Principles of the DVB System, $2^{nd}$ edition, pp. 74-80 (no date).
AH Digital Audio and Video Series, "DTV Receivers and Measurements," Understanding Digital Terrestrial Broadcasting, pp. 159-164 (no date).
O'Driscoll, The Essential Guide to Digital Set-Top Boxes and Interactive TV, pp. 6-24 (no date).
Ius Mentis, "The ElGamal Public Key System," pp. 1-2 (Oct. 1, 2005) online at http://www.jusmentis.com/technology/encyrption/elgamal/.
Schneier, "Crypto Bibliography," Index of Crypto Papers Available Online, pp. 1-2 (online) (no date).
No Author, No Title, pp. 344-355.

No Author, "Part Four Networks," No Title, pp. 639-714 (no date).
Microsoft Word User's Guide, pp. 773-774, 315-316, 487-489, 561-564, 744, 624-633 (1993).
No Author, "What is the ElGamal Cryptosystem," p. 1 (Nov. 27, 2006) online at http://www.x5.net/faqs/crypto/q29.html.
Johnson et al., "A Secure Distributed Capability Based System," ACM, pp. 392-402 (1985).
Wikipedia, "El Gamal Encyption," pp. 1-3 (last modified Nov. 2, 2006) online at http://en.wikipedia.org/wiki/ElGamal_encryption.
Blaze, "Atomic Proxy Cryptography," p. 1 Abstract (Oct. 20, 1998).
Blaze, "Matt Blaze's Technical Papers," pp. 1-6 (last updated Aug. 6, 2006)].
Online Search Results for "inverted file", "inverted index" from www.techweb.com, www.cryer.co.uk, computing-dictionary.thefreedictionary.com, www.nist.gov, cn.wikipedia.org, www.cni.org, www.tiscali.co.uk (Jul. 15-16, 2006).
Corporation for National Research Initiatives, "Digital Object Architecture Project", http://www.nnri.reston.va.us/doa.html (updated Nov. 28, 2006).
Stefik, Summary and Analysis of A13 (Kahn, Robert E and Vinton G Cerf, "The Digital Library Project, vol. 1: The World of Knowbots (DRAFT), An Open Architecture for a Digital Library System and a Plan for its Development," Corporation for National Research Initiatives (Mar. 1988)), pp. 1-25 (May 30, 2007).
"National Semiconductor and EPR Partner for Information Metering/Data Security Cards" Mar. 4, 1994, Press Release from Electronic Publishing Resources, Inc.
Weber, R., "Digital Rights Management Technology" Oct. 1995.
Flasche, U. et al., "Decentralized Processing of Documents", pp. 119-131, 1986, Comput. & Graphics, vol. 10, No. 2.
Mori, R. et al., "Superdistribution: The Concept and the Architecture", pp. 1133-1146, 1990, The Transactions of.
Weber, R., "Metering Technologies for Digital Intellectual Property", pp. 1-29, Oct. 1994, A Report to the International Federation of Reproduction Rights Organizations.
Clark, P.C. et al., "Bits: A Smartcard protected Operating System", pp. 66-70 and 94, Nov. 1994, Communications of the ACM, vol. 37, No. 11.
Ross, Re., "Data Guard", pp. 101, Jun. 6, 1994, Forbes.
Saigh, W.K., "Knowledge is Sacred", 1992, Video Pocket/Page Reader Systems, Ltd.
Kahn, R.E., "Deposit, Registration and Recordation in an Electronic Copyright Management System", pp. 1-19, Aug. 1992, Corporation for National Research Initiatives, Virginia.
Hilts, P. et al., "Books While U Wait", pp. 48-50, Jan. 3, 1994, Publishers Weekly.
Strattner, A, "Cash Register on a Chip may Revolutionize Software Pricing and Distribution; Wave Systems Corp.", pp. 62, Apr. 1994, Computer Shopper, vol. 14, No. 4, ISSN 0886-0556.
O'Conner, M., "New Distribution Option for Electronic Publishers; 'Opener Data Encryption and Metering System for CD-ROM use; Column", pp. 134, Mar. 1994, CD-ROM Professional, vol. 7, No. 2, ISSN: 1409-0833.
Willett, S., "Metered PCs: Is Your System Watching You? Wave System beta tests new technology", pp. 84, May 2, 1994, InfoWorld.
Linn, R., "Copyright and Information Services in the Context of the National Research and Education Network", pp. 9-20, Jan. 1994, IMA Intellectual Property Project Proceedings, vol. 1, Issue 1.
Perrit, Jr., H., "Permission Headers and Contract Law", pp. 27-48, Jan. 1994, IMA Intellectual Property Project Proceedings, vol. 1, Issue 1.
Upthegrove, L., "Intellectual Property I Ieader Descriptors: A Dynamic Approach", pp. 63-66, Jan. 1994, 1MA Intellectual Property Proceedings, vol. 1, Issue 1.
Sirbu, M., Internet Billing Service Design and prototype Implementation, pp. 67-80, Jan. 1994, IMA Intellectual Property Project Proceedings, vol. 1, Issue 1.
Simmel, S. et al., "Metering and Licensing of Resources: Kale's General Purpose Approach", pp. 81-110, Jan. 1994, IMA Intellectual Property Project Proceedings, vol. 1, Issue 1.
Kahn, R., "Deposit, Registration and Recordation in an Electronic Copyright Management System", pp. 111-120, Jan. 1994, IMA Intellectual Property Project Proceedings, vol. 1, Issue 1.

Tygar, J. et al., "Dyad: A System for Using Physically Secure Coprocessors", pp. 121-152, Jan. 1994. IMA Intellectual Property Project Proceedings, vol. 1, Issue 1.

Griswold, G., "A Method for Protecting Copyright on Networks", pp. 169-178, Jan. 1994, IMA Intellectual Property Project Proceedings, vol. 1, Issue 1.

Nelson, T., "A Publishing and Royalty Model for Networked Documents", pp. 257-259, Jan. 1994, IMA Intellectual Property Project Proceedings, vol. 1, Issue 1.

Robinson, E., "Redefining Mobile Computing", pp. 238-240, 247-248 and 252, Jul. 1993, PC Computing.

Abadi, M. et al., "Authentication and Delegation with Smart-cards", 1990, Research Report DEC Systems Research Center.

Mark Stefik, "Letting Loose the Light: Igniting Commerce in Electronic Publication", pp. 219-253, 1996, Internet Dreams: Archetypes, Myths, and Metaphors, IDSN 0-262-19373-6.

Mark Stefik, "Letting Loose the Light: Igniting Commerce in Electronic Publication", pp. 2-35, Feb. 8, 1995, Internet Dreams: Archetypes, Myths and Metaphors.

Henry H. Perritt, Jr., "Technological Strategies for Protecting Intellectual Property in the Networked Muitmedia Enviroment", Apr. 2-3, 1993, Knowbots, Permissions Headers & Contract Law.

Delaigie, "Digital Watermarking," Spie Conference in Optical Security and Counterfeit Deterrence Techniques, San Jose, CA (Feb. 1996).

Perritt, "Technologies Strategies for Protecting Intellectual Property in the Networked Multimedia Environment," Knowbots, Permissions Headers and Contract Law (Apr. 2 -3, 1993).

Johnson et al., "A Secure Distributed Capability Based System," Proceedings of the 1985 ACM Annual Conference on the Range of Computing: MID-80'S Perspective: MID-80'S Perspective *Association for Computing Machinery* pp. 392-402 (1985).

* cited by examiner

MULTI-STAGE WATERMARKING PROCESS AND SYSTEM

CROSS REFERENCE TO RELATED APPLICATIONS

This application is a Continuation Application of application Ser. No. 11/209,647, filed Aug. 24, 2005, which is a Continuation Application of application Ser. No. 11/142,256 filed on Jun. 2, 2005, which is a Continuation Application of application Ser. No. 09/749,895 filed Dec. 29, 2000.

BACKGROUND OF THE INVENTION

1. Field of the Invention

The present invention is directed to the field of digital rights management. More specifically, the present invention is directed to digital watermarking processes and systems.

2. Description of the Related Art

In the field of documents and publishing, a work created by an author is usually provided to a publisher which formats, duplicates and/or prints numerous copies of the document. A "document", as the term is used herein, is any unit of information subject to distribution or transfer, including but not limited to correspondence, books, magazines, journals, newspapers, other papers, software, photographs and other images, audio and video clips, and other multimedia presentations or products. A document may be embodied in printed form on paper, as digital data on a storage medium, or in any other known manner on a variety of media. The copies of the document are then sent by a distributor to bookstores or other retail outlets, from which the copies are purchased by end users. With the advent of current computing and communications systems such as personal computers, workstations, and other devices connected over communications networks such as local area networks (LANs), intranets, and the Internet, publishers and authors are increasingly publishing their documents electronically to minimize cost and delays. Presently, audio and video recordings, software, books, journals and multimedia works, are all being electronically published.

A fundamental issue facing the publishing and other information industries as they consider electronic publishing, is how to prevent the unauthorized and unaccounted distribution or usage of electronically published documents. Electronically published documents are typically distributed in digital form and recreated on a computer based system having the capability to recreate the published document. The ease in which electronically published documents can be accurately reproduced and distributed is a major concern. Because publishers, authors, as well as other parties in these industries receive royalties for each published document that is delivered (i.e. sold), any unaccounted distribution of the document such as by copying or distribution to another digital medium results in unpaid royalties. Moreover, whereas the low quality of copying and the high cost of distributing printed material have served as deterrents to unauthorized copying in the past, it is far too easy to copy, modify, and redistribute unprotected digital documents. Accordingly, some method of protecting digital documents is necessary to make it more difficult to copy such documents without authorization. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital rights management (DRM)" herein. There are a number of issues in digital rights management: authentication, authorization, accounting, payment and financial clearing, rights specification, rights verification, rights enforcement, and document protection, for example.

Two basic schemes have been employed to attempt to solve the document protection problem. The first approach is the use of subscription based services in which the user is granted access to the document (or information to generate the document) only after paying a subscription fee. Existing digital rights management systems such as IBM's Cryptolopes utilizes encryption technology to encrypt documents which are then decrypted by users who have paid for the documents or have been otherwise authorized to have access to the documents. However, once these documents are distributed and have been decrypted by an end user system, little protection is available to prevent copying or distributing the decrypted document. In addition, there is no effective way to trace back such copies of the document to the original source and the intended user. The second approach is to utilize proprietary formats wherein the document can only be generated by a select application that is obligated to enforce the publisher's rights. Of course, this approach requires the use of a single proprietary format and thus, one loses the ability to combine popular formats and the richness of content associated therewith. In addition, this approach requires the user to use a previously unknown application and requires development of the select application in order for each format to be created in a secure manner. Furthermore, the documents must be generated or converted using non-standard tools.

To deter "pirating", i.e. unauthorized copying, use, or distribution of the documents, "watermarks" are frequently used to identify the copyright owners, authorized users, and/or distributors. Such watermarking also aids in the identification of the source of the document thereby allowing enforcement of the rights of the publisher and/or the author. With respect to the digitally published documents, current digital watermarking technology digitally marks the document with details such as information provided by the copyright owner, the authorized user, or the distributor. Typically, a watermark is used to identify the source or originator of a document. If the watermark is used to identify the user to whom the document is delivered, it is typically referred to as a "fingerprint". The technologies utilized for both watermarking, and fingerprinting, are typically the same. Thus, the term "watermarking" is used herein to refer to both watermarking and fingerprinting, and the terms "watermark" and "mark" are also used herein to refer to both watermarks and fingerprints.

Presently, most existing watermarking products or tool kits generate marked documents via document editors or special tools. For instance, Adobe Photo Shop® is a widely used software tool for image creation and publishing on the Internet. DigiMarc Corporation has provided a plug-in to Photo Shop 4.0® which allows a user to embed into an image, a digital ID (which is issued by DigiMarc) as well as some attributes such as the type of use and content. IBM® has also introduced digital watermarking technology through a plug-in for Photo Shop® to identify and preserve the rights of digital content owners. In addition, watermarking of audio clips such as a music file has also been attained by converting the music file into a frequency domain utilizing Fourier transforms, embedding a watermarking signal at a desired frequency range, and reconverting the music file. In this regard, efforts have been taken to standardize DRM of digital music as evidenced by the Secure Digital Music Initiative which may be found in the Internet address www.sdmi.org.

Despite the utility that the above-described plug-ins and watermarking techniques provide, these watermarking products have several key limitations. More specifically, the present applicants have found that the current processes and systems "bind" or affix the content information into the watermark at early stages of the document life cycle thereby limiting the type of content information which can be stored in the watermark to "static" information which is known or already determined. Another limitation arise from the fact that watermarks are frequently placed into documents manually through the use of WYSIWYG (what you see is what you get) editors or other tools. Tools exist for merging watermarks into multiple same objects (such as images) of a target document automatically. However, such tools do not facilitate insertion of various watermarks into target documents that have multiple differing objects. Moreover, the use of existing processes and systems for inserting watermarks are limited to a single watermarking technology and thus, are limited to utilizing one predetermined application. Consequently, the existing systems and methods do not allow selection of different or multiple technologies nor support use of such different technologies.

Therefore, there exists an unfulfilled need for a watermarking process and system which will provide a solution to the above noted limitations to thereby allow efficient creation and use of watermarks to identify and preserve the rights of digital content owners.

BRIEF SUMMARY OF THE INVENTION

In view of the foregoing, it is an object of the present invention to provide an improved process and system that will allow efficient creation and use of watermarks to identify and preserve the rights of digital content owners.

A second object of the present invention is to provide an improved process and system that will allow early and late binding of content information into the watermark.

A third object of the present invention is to provide an improved process and system that will support the use of multiple watermarking and merging technologies.

Another object of the present invention is to provide an improved process and system that will allow automatic or manual merging of watermarks into the document.

A fifth object of the present invention is to provide an improved process and system that will create a watermark specification and render the watermark at different stages of the watermarking process.

Still another object of the present invention is to provide such an improved process and system that generates a template specification and merges the watermark into the document at different stages of the watermarking process.

Yet another object of the present invention is to provide such an improved process and system that allows generation and merging of the watermark into the document at different stages of the watermarking process.

These objects are obtained by a multi-stage watermarking system and process in accordance with embodiments of the present invention which perform the steps of creating a watermark specification which describes how to generate a watermark, generating a template specification which describes how to merge the watermark into a target document, generating the watermark based on the watermark specification, and merging the watermark into the target document based on the template specification to provide a watermarked document.

The watermark specification created may include content information which describes content to be in the watermark and the watermark may have a plurality of content information associated therewith. The content of each of the content information may be application specific and specify at least one of static information and dynamic information. The watermark specification created may also include mark technology specification which describes a specific watermarking technology to be used in the step of generating the watermark. The mark technology specification may include parameters needed by the specific watermarking technology during the step of generating the watermark. The watermark specification created may also include a target object specification which describes at least one of a target object and a characteristic of the target object into which the watermark is generated, the target object specification specifying at least one of a shape, color, font and resolution of an image. The target object specification may include a pointer pointing to a content information which describes the content to be inserted in the watermark. In this regard, the watermark specification created may described using a watermark specification language that has grammar elements that: identifies the watermark specification, identifies a specific watermarking technology to be used, and identifies a target object in which the watermark is generated. Optionally, the watermark specification language may have grammar elements that at least one of: identifies version of the watermark specification language, identifies a name of the watermark specification, and specifies technology of content information of the watermark specification.

In accordance with one embodiment of the present invention, the template specification generated may include a merge map associated with the watermark specification which describes where the watermark is to be merged into the target document. A plurality of merge maps may be associated with the watermark specification. The template specification generated may include a merge technology specification which describes a specific merging technology to be used in the step of merging the watermark into the target document. The template specification generated may also include merge target specification which describes at least one of the target document and a characteristic of the target document into which the watermark is merged. In addition, the template specification generated may be described using a watermark specification language having grammar elements that: identifies version of the watermark specification language, provides a list of a plurality of watermark specifications to be used, and provides a mapped list of how a plurality of watermarks associated with the plurality of watermarks is to be merged with the target document. In this regard, the watermark specification language may optionally have grammar elements that at least one of: identifies the template specification, identifies a name of the template specification, provides a description of the template specification, identifies owner authorized to change the template specification, and provides comments regarding the template specification.

In accordance with another embodiment of the present invention, the step of generating the watermark in the multi-stage watermarking system and process may include the step of binding dynamic information in the watermark. In addition, the step of generating the watermark may also include the step of receiving and interpreting information from the watermark specification. The step of generating the watermark may also include the step of parsing the watermark specification to thereby obtain the information required to generate the watermark. The step of generating the watermark may further include the step of encoding the content that is to be in the watermark. In this regard, the specific watermarking technology may be used to place the encoded content in a target object to be merged into the target document.

In accordance with yet another embodiment of the present invention, the step of merging the watermark may include the step of receiving and interpreting information from the template specification. The step of merging the watermark may also include the step of parsing the template specification to thereby obtain the information required to merge the watermark into the target document. In addition, the step of merging the watermark may also include the step of merging the watermarks into the target document to thereby provide the marked document. Moreover, the step of merging the watermark may also include the step of merging the generated watermark in a target object which is then merged into the target document to thereby provide the watermarked document.

Optionally, in accordance with another embodiment, the multi-stage watermarking system and process of the present invention may also include the step of recovering the content information from the watermarked document. The content information may be recovered based on at least one of the watermark specification and the template specification.

The above objects are also attained by a system for specifying, generating, and merging digital watermarks into a document at different stages of the document's life cycle in accordance with the present invention including a content information means for describing application-specific content to be in watermarks, the application-specific content being generated by multiple applications and including application identification that is used during watermarks recovery; a static information means for specifying static content that is already determined for binding into the watermarks; and a dynamic information means for specifying dynamic content that is to be determined for binding into the watermarks by the time of at least one of generating the watermarked, and creating the watermarked document.

In accordance with another embodiment, the system may also include a mark technology specification means for describing a specific watermarking technology to be used in creating the watermarks, where the mark technology specification means further includes parameters needed by the specific watermarking technology. The system may also include a target object specification means for providing the target object information that describes the target object into which the watermarks are generated.

The system may also include a target object specification means for providing the target object information that describes the target object into which the watermarks are generated. The data capacity of the watermarks may be determined based on at least one of the content information and the target object information. If the data capacity of the watermark is insufficient, then the content may be truncated or a pointer to the content information may be generated.

The system preferably binds the static content to the watermarks prior to the binding of dynamic content to the watermarks and the watermark is merged into the document by at least one of manually by a user and automatically by the system. The system may further include a mark specification interpreter which supports multiple marking technologies.

The above noted objects may be further attained by a system for specifying, generating, and merging digital watermarks into a documents at different stages of the document's life cycle in accordance with the present invention including a content information means for generating application-specific content information to be in the watermark, the application-specific content information being generated by multiple applications and including application identification that is used during watermark recovery; a watermark specification means for generating a watermark specification having information regarding the watermark based on the content information; a template specification means for generating a template specification having at least one merge map that describes how each watermark is to be merged into a target document; and a watermark generation means for generating the watermark in a target object based on at least one of a watermark specification, a target object information, and dynamic content information.

In accordance with one embodiment, the content information may also include at least one of digital rights information, text content information, and reference to a workflow processing application. The watermark specification means may include a watermark specification interpreter with a parser that parses the watermark specification, the watermark specification interpreter adapted to obtain the application-specific content information from the watermark specification and to invoke appropriate encoders to encode the content information that is to be in the watermark. In this regard, the watermark specification interpreter may support multiple marking technologies.

The system may further include a static information means for specifying static content that is already determined for binding into the watermarks and a dynamic information means for specifying dynamic content that is to be determined for binding into the watermarks by the time of at least one of generating the watermark, and creating the watermarked document. The static content is preferably bound to the watermarks prior to the binding of dynamic content to the watermarks.

In accordance with yet another embodiment, the system may further include a mark technology specification means for describing a specific watermarking technology to be used in creating the watermarks. The mark technology specification means may include parameters needed by the specific watermarking technology. The system may also include a target object specification means for providing the target object information that describes a target object into which the watermarks are to be generated. The data capacity of the watermarks are preferably determined based on at least one of the content and the target object information.

In accordance with still another embodiment of the present invention, the template specification may also include a merge technology specification that describes the specific merging technology to be use in merging the watermarks into the target document. The template specification may include a merge target specification that describes the target document into which the watermarks are to be merged.

Preferably, the watermark is merged into the document by at least one of manually by a user and automatically by the system. In addition, the template specification is preferably generated based on the watermark specification and may include a template specification interpreter that utilizes a parser to parse the template specification.

These and other objects, features and advantages of the present invention will become more apparent from the following detailed description of the preferred embodiments of the present invention when viewed in conjunction with the accompanying drawings.

DETAILED DESCRIPTION OF THE INVENTION

As will be evident by the discussions provided hereinbelow, the preferred embodiment of the multi-stage watermarking process and system in accordance with the present invention allows efficient creation and use of watermarks to identify and preserve the rights of digital content owners. Initially, it is noted that U.S. patent application Ser. No. 08/948,893 which is incorporated herein by reference, discloses the use of watermarks in identifying and preserving the rights of digital content owners. Moreover, as previously noted, it should be kept in mind that the term "watermarking" as used herein below refers to both watermarking and fingerprinting, and that the terms "watermark" and "mark" also used herein refer to both watermarks and fingerprints.

Figure 1:
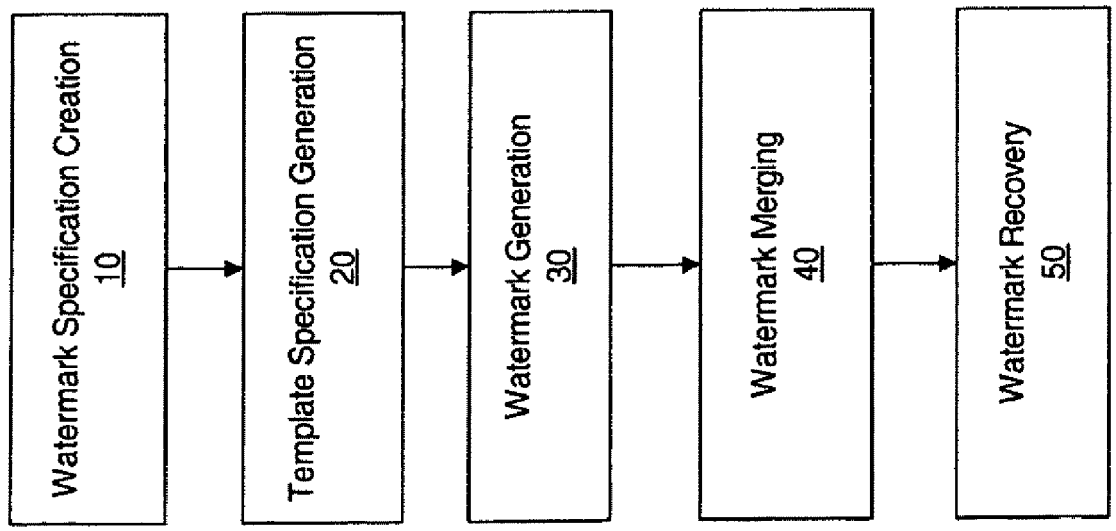
FIG. 1 is a schematic illustration of a multi-stage watermarking process in accordance with one embodiment of the present invention.

FIG. 1 shows a schematic illustration of a multi-stage watermarking process 2 in accordance with one embodiment of the present invention which will attain the above noted objectives. As can be seen, the multi-stage watermarking process 2 in the illustrated embodiment includes various steps or "stages" including a watermark specification creation 10 stage, a template specification generation 20 stage, a watermark generation 30 stage, and watermark merging 40 stage. Moreover, the illustrated embodiment also includes an optional watermark recovery 50 stage. These stages of the multi-stage watermarking process 2 may be executed by a system such as a computer system (not shown) or the like to thereby provide a process and system which avoids the limitations of the prior art processes and systems. In this regard, it should be initially clarified that the present invention may be practiced using a computer system (including distributed and/or networked systems) and may be embodied as a software program to be executed in such systems. In such an embodiment, the various stages may be embodied or otherwise executed as modules of the software program. These modules may be separate from one another or be integrated together, as long as the modules perform the various desired steps or functions as described in the claims appended hereto.

The multi-stage water marking process 2 and a system of the present invention allows the creation of a watermark specification which describes the watermark, and the actual rendering or generation of the watermark, to occur at different stages of the watermarking process. For instance, the present invention allows the specification of the watermark to be created in a first system, whereas the generation of the watermark occurs subsequently on a second system, so long as the second system has access to the watermark specification created by the first. In addition, the multi-stage watermarking process 2 of the present invention also allows the generation of a template specification which describes how to merge the watermark into a target document, and the actual merging of the watermark into the document, to occur in different stages within the watermarking process. Moreover, the multi-stage watermarking process 2 further allows the generation of the watermark and the merging of the watermark into the document to occur at different stages in the watermarking process. As will be explained in further detail below, this enables mixing of watermarking technologies within a given document, support for various merging technologies, and also allows these stages to occur at different times and on different systems.

Importantly, as will be evident to one of ordinary skill in the art in view of the discussions below, these provisions of the multi-stage watermarking process 2 allow early and late binding of content information of the watermark. In particular, the process in accordance with the present invention allows one to have both early binding of static information, and late binding of dynamic information in the watermark. Thus, the present invention allows late binding of dynamic information so that it is possible to incorporate content information into the watermarks which are only available or determined at later stages of the document life cycle. For instance, the name of the system or device that creates the watermarked document or the time at which the watermarked document is created can only be determined at the time of their occurrence. Furthermore, the present invention allows automatic (as well as manual) merging of watermarks into a document. In this regard, the present invention allows marking of multiple documents with a single watermark specification, as well as marking a single document with multiple watermark specifications. Such a feature would be very useful to those who desire to mark a large collection of documents using the same set of watermarks. For instance, one can create a template specification for merging multiple watermarks (as defined by watermark specifications) into multiple target documents. Moreover, as will be explained in further detail below, by providing a multi-stage watermarking process 2, the present invention allows multiple watermarking and merging technologies to be used within a document.

The discussion hereinbelow describes in further detail the embodiment of the multi-stage watermarking process 2 in accordance with the present invention as shown in FIG. 1.

However, for clarity and to facilitate understanding, the discussion hereinbelow sets forth the various stages of the watermarking process 2 of FIG. 1 noted above as well as other aspects of the present invention under separate sub-headings.

Watermark Specification Creation

Figure 2:
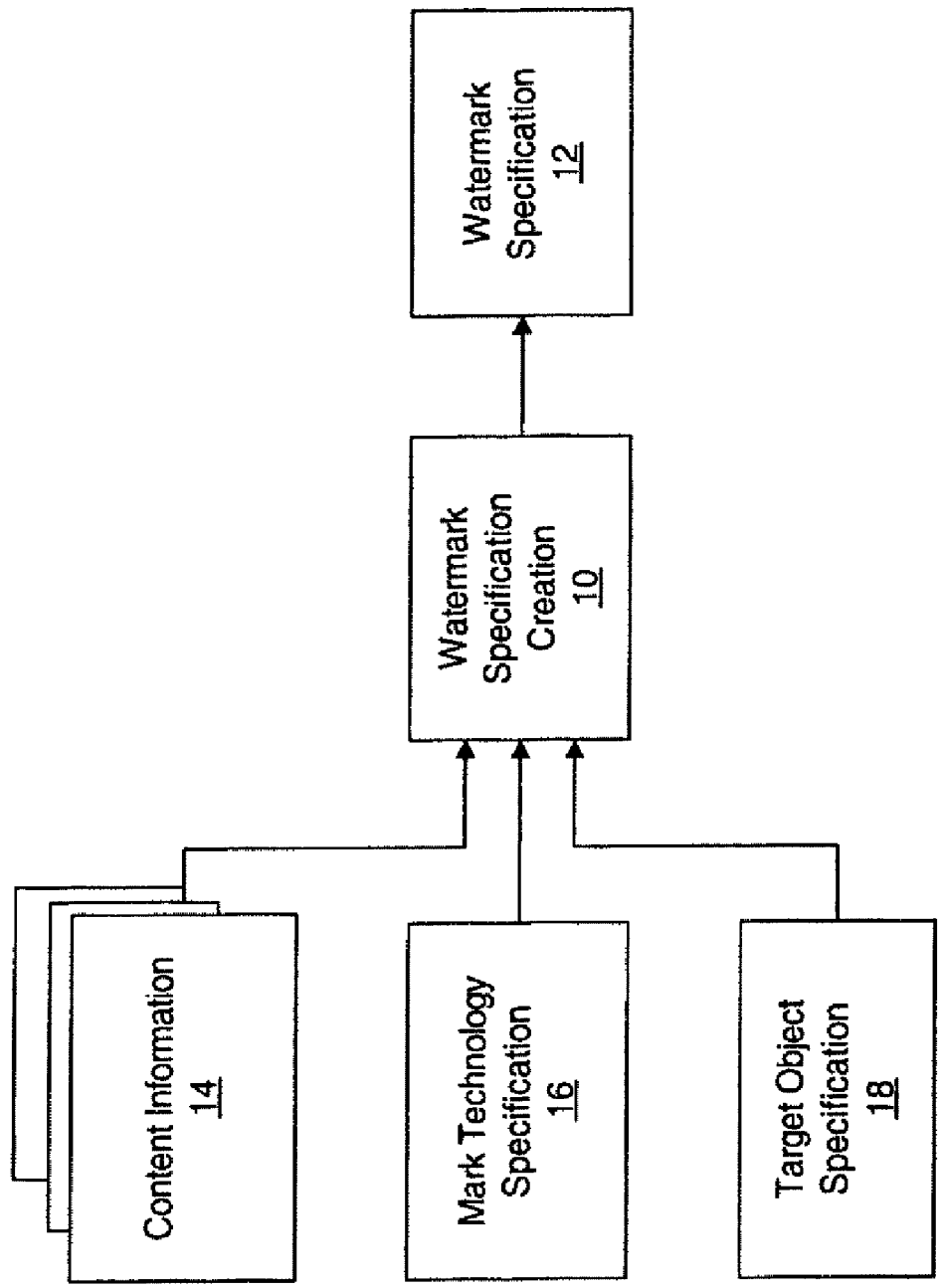
FIG. 2 is a schematic illustration of a watermark specification creation stage in accordance with one embodiment of the present invention.

As can be seen, one stage of the multi-stage watermarking process 2 in accordance with the illustrated embodiment of the present invention is the watermark specification creation 10 stage. FIG. 2 illustrates the watermark specification creation 10 stage in accordance with one embodiment of the present invention in further detail. As can be seen, the main output of this stage is a watermark specification 12 that describes how the watermark is to be generated, what information is to be in the watermark, and what technology is to be used in generating the watermark. As will be described in further detail below, the watermark may be generated and directly merged into the target document or may optionally generated within a specified target object which is then merged into the target document. In applications where the document is textual, the target object may be an area or region in which the watermark is to be placed. In applications where the document is an audio clip, a video clip, or other multimedia product, the target object may be a video segment or a frequency range or other portion of the multimedia product. It should also be noted that various different computer languages can be used to create the watermark specification 12. However, a preferred embodiment of a watermark specification language is described below. As can be seen, the watermark specification creation 10 stage utilizes various components to create the watermark specification 12. These various components include content information 14, mark technology specification 16, and target object specification 18.

The content information 14 describes the application-specific content that is to be inserted into the watermark. It is noted that the content is application-specific which means that multiple different applications may be used to provide multiple, different content information 14 as shown in FIG. 2. Correspondingly, it should be appreciated that one can have multiple content information 14 (i.e. from multiple applications) within a single watermark as long as there is enough data capacity in the watermark. Each of the content information 14 also includes the application identification that will be used later in the multi-stage watermarking process as will be discussed below. In addition, the content information 14 may include a pointer which points to the target object where the watermark is generated if applicable. The content information 14 may further specify the "static" information and the "dynamic" information. In particular, the static information is the data/information relative to the watermark or the document that is already determined or presently known such as the publisher's identity and initial publication date, etc. On the other hand, the dynamic information is the data/information relative to the watermark or the document that is not determined or presently known but is to be resolved at a later time, such as when the watermarked document is created. Such dynamic information may include the identity of the authorized distributor or the intended end user who has proper access to the digital document, which in digital publishing, may not be readily known until the document is received, generated and/or printed by the distributor or the intended end user.

The mark technology specification 16 which is also a component of the watermark specification 12 describes a specific watermarking technology to be used in generating the watermark. For instance, the mark technology specification 16 may specify either DataGlyph® or DigiMarc®, for example, both of these watermarking technologies being commercially available. Other technologies include Verance®'s Electronic DNA®, Alpha Tech®'s EIKONAmark®, Audiomark® and Videomark®, Blue Spike®, and IBM® applications, etc. The mark technology specification 16 may also include various parameters needed by the specific watermarking technology, such as specific parameters specifically required by DataGlyph® or DigiMarc®.

The target object specification 18 which is an optional component of the watermark specification 12 describes the target object into which the watermark may be generated in one embodiment of the present invention. As previously noted, the target object refers to an area, region or a portion in which the watermark may be generated. For instance, the target object specification 18 for a DataGlyph® watermark may specify at least one of a shape, color, font and resolution of an image into which a DataGlyph® watermark is to be generated, the target area then being merged into the target document as described below. For watermarking technologies that embed watermarks into images, the target object specification 18 may specify that the target object is an image. Again, as previously noted, in applications where the document is an audio clip, a video clip, or other multimedia product, the target object may be a video segment or a frequency range or other portion of the multimedia product. It should further be noted that the target object specification 18 may describe a specific target object, or a characteristic of the target object, in which case the generation of the watermark may optionally occur at a later stage described hereinbelow. It is again noted that the generation of the watermark in a target object and merging of the target object into the target document is optional and in other embodiments, the watermark may be directly merged into the target document.

In the above described manner, the watermark specification creation 10 stage of the present process utilizes content information 14, mark technology specification 16, and optionally, target object specification 18 to thereby create the watermark specification 12. Thus, the watermark specification 12 describes how the watermark is to be generated, what information is to be in the watermark, and what technology is to be used in generating the watermark. It is also noted that as part of the process of generating the watermark specification 12 (or as part of watermark generation described hereinbelow), the size of the content information 14 is preferably checked against the data capacity of the watermark itself. The capacity of the watermark may be determined based on the mark technology specification 16 and the target object specification 18, if applicable. If there is insufficient data capacity in the watermark, various methods may be utilized to address the insufficiency. For example, the watermark may be truncated, or a pointer may be provided in the watermark to point to the content information 14 rather than putting the actual content in the watermark.

Template Specification Generation

Figure 3:
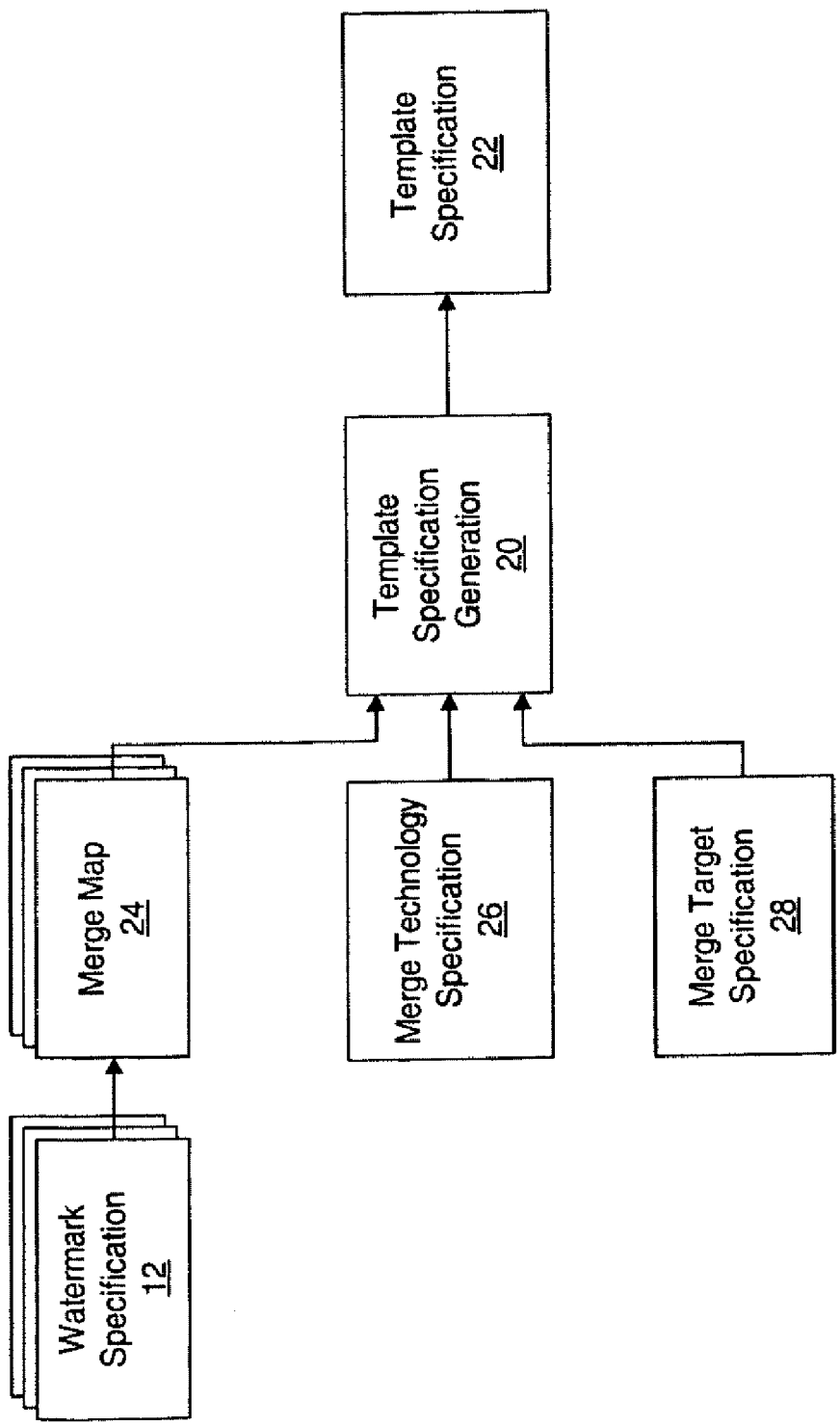
FIG. 3 is a schematic illustration of a template specification generation stage in accordance with one embodiment of the present invention.

The multi-stage watermarking process 2 in accordance with preferred embodiment of the present invention as shown in FIG. 1 also includes a template specification generation 20 stage which is shown in further detail in FIG. 3. The primary output of the template specification generation 20 stage is template specification 22 which describes how to merge one or more watermarks directly into the target document, or by merging a target object with the watermark as described previously. For instance, the template specification 22 may indicate which pages a specific watermark should appear if the document is a textual product such as a correspondence or a book. In applications where the document is an audio clip, a video clip or some other multimedia product, the template specification 22 may indicate the audio/visual segments into which the watermarks are merged. The template specification 22 may also include a pointer that points to the target document. In a similar manner to the watermark specification 12 described above, different languages can be developed and/or used for generating the template specification 22. However, as noted previously, an example of a watermark specification language is described in a later section below. As can be clearly seen in FIG. 3, the template specification 22 is generated during the template specification generation 20 stage utilizing merge maps 24 that correspond to each watermark specification 12 as described below. In addition, optional components such as a merge technology specification 26, and a merge target specification 28 may also be utilized in generating the template specification 22.

More specifically, the merge maps 24 describe where each watermark or watermark in a target object, as represented by watermark specification 12 of FIG. 2, is to be merged into the target document. Preferably, there is one watermark specification 12 associated with each merge map 24 since each watermark should be merged into the target document in at least one location. Otherwise, there is no need for a watermark specification for a watermark which is not used. However, it should be noted that the watermark specification 12 may be associated with multiple merge maps 24 since the same watermark may be merged into the target document at various locations.

As noted above, the merge technology specification 26 shown in FIG. 3 is an optional component which may be used to generate the template specification 22 during the template specification generation 20 stage. The merge technology specification 26 describes the specific merging technology to be used in merging the watermarks into the target document. For example, the merge technology specification 26 may indicate PostScript® forms, Document Object Model, XML, MS Office®, etc. which are all different technologies. As can be appreciated by one of ordinary skill in the art, this description of the specific merging technology is desirable if the merge technology to be used requires specific parameters to be defined.

As previously noted, the merge target specification 28 shown in FIG. 3 is also an optional element which may be used to generate the template specification 22 during the template specification generation 20 stage. The merge target specification 28 describes the target document into which the watermarks are to be merged. For instance, the merge target specification 28 may indicate that the target document is a correspondence, book, magazine, journal, newspaper, other paper, software, photograph, image, audio and video clips, or a multimedia presentation or product. In this regard, it should be noted that merge target specification 28 may describe a specific target document or a characteristic of the target document, in which case binding of the watermark may occur at later stages as described hereinbelow.

Watermark Generation

Figure 4A:
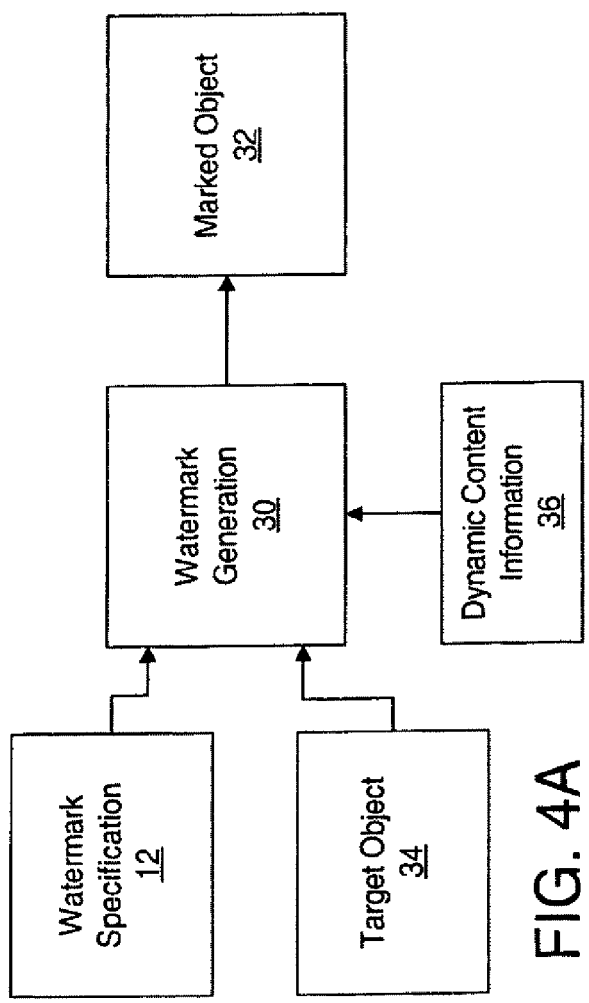
FIG. 4A is a schematic illustration of a watermark generation stage in accordance with one embodiment of the present invention.

The multi-stage watermarking process 2 in accordance with one embodiment of the present invention as shown in FIG. 1 also includes a watermark generation 30 stage as shown in FIG. 4A. As can be seen, in the illustrated embodiment, the watermark generation 30 stage generates a watermark in a target object to thereby provide a marked object 32 as its output based on the watermark specification 12 described previously relative to FIG. 2. Thus, in this embodiment, the marked object 32 is a watermarked target object (i.e. the marked object 32) which may later be merged with the target document. Such use of target objects is especially useful in textual documents where sizing and positioning of the watermark may be required and in HTML applications where a specific watermark may only be associated with a specific hyperlink or a specific web page. Of course, as previously explained, the present invention may also be practiced without the use of such target objects by generating the watermark and directly merging the watermark into the target document. However, with respect to the illustrated embodiment where target objects are used, the various components used in the watermark generation 30 stage of the multi-stage watermarking process 2 may be the watermark specification 12 (of FIG. 2), the target object 34 to which the watermark specification 12 points to, and dynamic content information 36, if dynamic information is to be bound or affixed into the watermark.

Figure 4B:
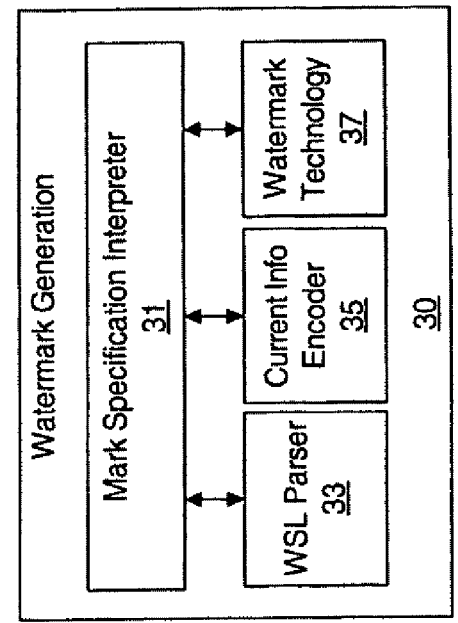
FIG. 4B is an detailed schematic illustration of a watermark generation stage of FIG. 4A.

The details of one embodiment of the watermark generation 30 stage is more clearly shown in FIG. 4B. As can be seen, the watermark generation 30 stage includes a mark specification interpreter 31 which utilizes a watermark specification language (WSL) parser 33 to parse the watermark specification 12 to thereby obtain the information required to generate the marked object. Such information may include information from the mark technology specification 16 and/or the mark technology specification 16 discussed relative to FIG. 2. The mark specification interpreter 31 also invokes the appropriate content information encoder 35 to encode the content that is to be inserted into the watermark. The watermark technology 37 then places the content into the target object in the form of watermarks. It should also be noted that in accordance with the embodiment of the present invention, different watermark technologies 37 can be used to generate the watermark. For instance, the watermark technology can be DataGlyph®, or any other suitable technology.

By providing a multi-stage water marking process 2 with a watermark specification creation 10 stage and a separate watermark generation 30 stage, the present invention allows the creation of a watermark specification 12, and the actual generation or rendering of the watermark to occur at different stages of the watermarking process 2. Thus, the present invention allows the specification of the watermark to be created in one system, whereas the generation or rendering of the watermark may occur subsequently on a different rendering device.

Watermark Merging

Figures 5A, 5B:
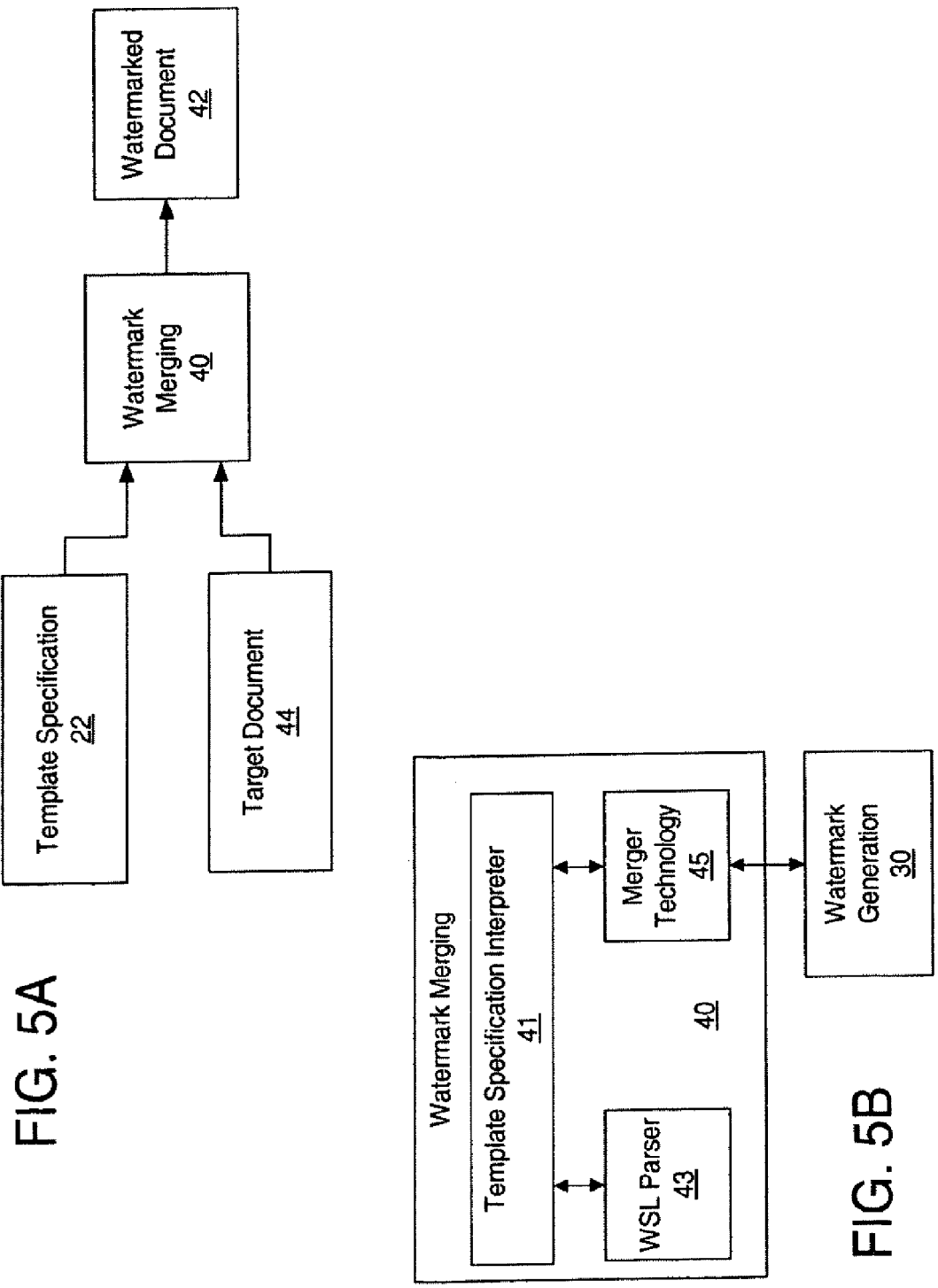
FIG. 5A is a schematic illustration of a watermark merging stage in accordance with one embodiment of the present invention.
FIG. 5B is an detailed schematic illustration of a watermark merging stage of FIG. 5A.

The multi-stage watermarking process in accordance with one embodiment of present invention also includes watermark merging 40 stage in which the watermark generated during the watermark generation 30 stage is merged into the target document. As previously explained, the watermark may be directly merged into the target document. However, if the watermark was generated in a target object to thereby provide a marked object 32, the target object with the watermark therein (i.e. the marked object 32) may be merged into the target document. As shown in FIG. 5A, a watermarked document 42 is outputted by merging the watermark or the marked object into the target document 44. It should be noted that whereas in the present illustrated embodiment, the target document 44 (and thus the resulting watermarked document 42) is an actual document, in other embodiments, the target document 44 may alternatively be another object so that the watermarked document 42 is another watermarked object that can later be merged into a document. Thus, the term "document" should be construed broadly to mean actual documents or objects. As can be also seen in FIG. 5A, the watermarked document 42 is provided in the watermark merging stage 40 based on various components including the previously described template specification 22 of FIG. 3, and a target document 44 to which the template specification 22 points to.

The specific details of one embodiment of the watermark merging 40 stage is more clearly illustrated in FIG. 5B. As can be seen, the watermark merging 40 stage includes a template specification interpreter 41 which utilizes the watermark specification language parser 43 to parse the template specification 22 of FIG. 3 to thereby obtain the watermark specification 12 and the mapping requirements as provided by the merge maps 24. The template specification interpreter 41 then invokes the merge technology 45 to merge the watermarks or the target objects with the watermarks therein (i.e. marked objects 32) into the target document to thereby provide the watermarked document 42. It should also be noted that different merging technologies can be used to generate the watermarked document 42, depending on the format and the requirements of the watermarked document 42. For instance, there may be specific merge technologies for PostScript (via forms) or for MS Office, etc.

In the manner described above, the multi-stage watermarking process 2 of the present invention thus allows the creation of template specification 22 and the actual merging of the watermark into the document to occur in different stages within the watermarking process 2. Moreover, the multi-stage watermarking process 2 further allows the generation and merging of the watermark into the document at different stages in the watermarking process. This enables mixing of watermarking technologies within a given document and also allows these stages to occur at different times and on different systems. As can now be appreciated by one of ordinary skill in the art, these provisions of the multi-stage watermarking process 2 allows early binding of static information and late binding of the dynamic information in the watermark. The present invention also allows automatic (as well as manual) watermarking of multiple documents with a single watermark specification, as well as watermarking a single document with multiple watermark specifications. Moreover, the multi-stage watermarking process 2 of the present invention provides support for various watermarking and merging technologies.

Watermark Recovery

Figure 6:
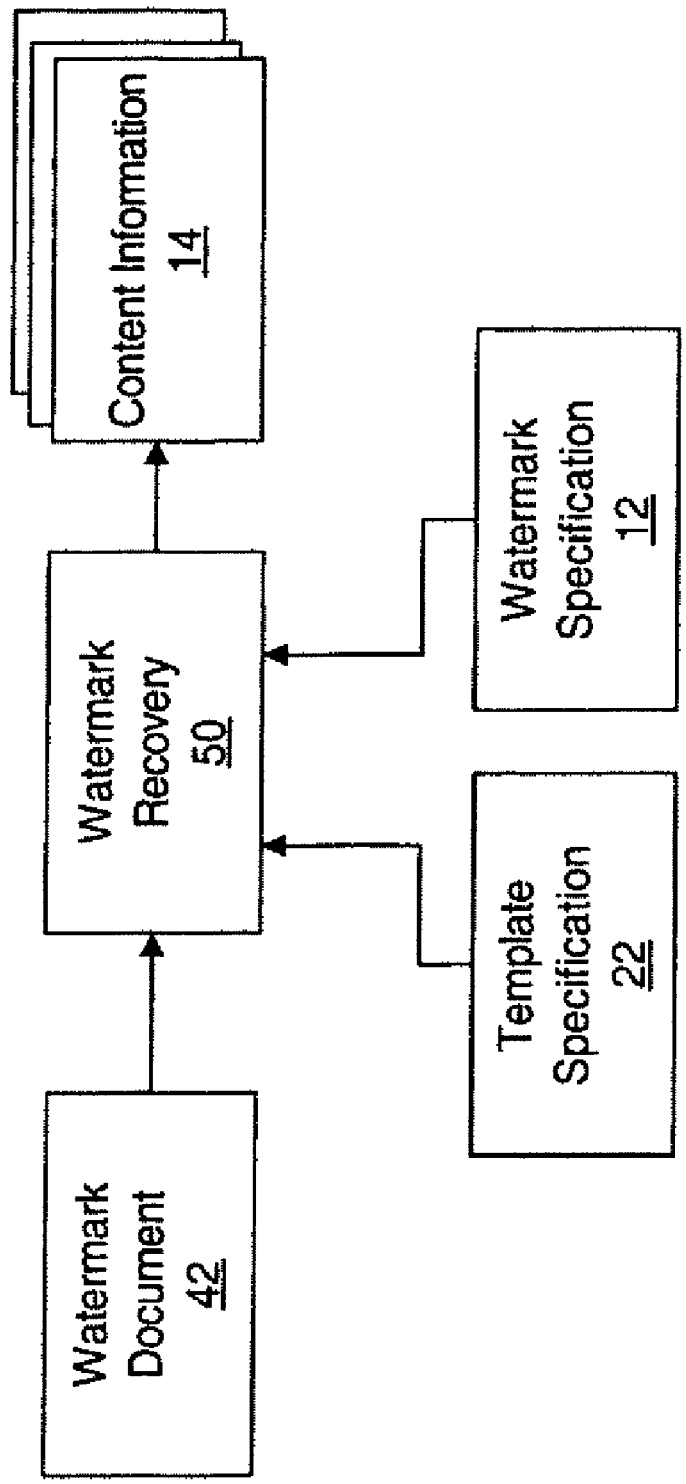
FIG. 6 is a schematic illustration of a watermark recovery stage in accordance with one embodiment of the present invention.

The multi-stage watermarking process 2 in accordance with the embodiment of the present invention as illustrated in FIG. 1 also includes an optional watermark recovery 50 stage which is more clearly shown in FIG. 6. In the watermark recovery 50 stage, the content information 14 (FIG. 2) which was previously put into the watermark of the watermarked document 42 in the manner described above, is now recovered from the watermarked document 42. This may attained by utilizing an object character recognition (OCR) system known in the art to thereby obtain desirable information regarding the watermarked document. For instance, the recovery of the watermark may be desired to recognize the type of document, determine the document's authenticity, the document's source, or other relevant information. The template specification 22 and the watermark specification 12 which were also described previously relative to the other stages of the multi-stage watermarking process 2, may also be utilized to effectively recover the content information 14.

Object Model

Figure 7:
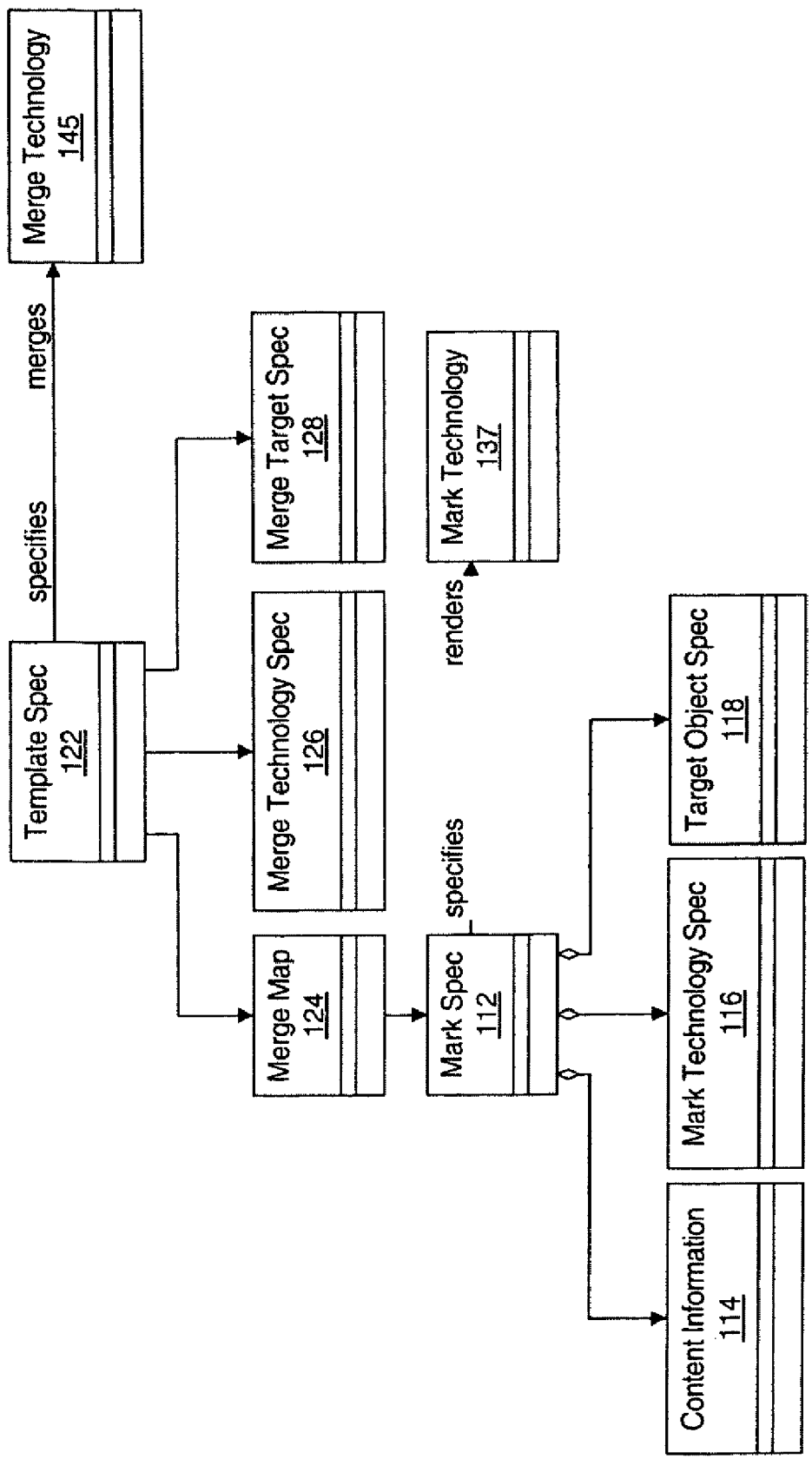
FIG. 7 is an object model illustration of a multi-stage watermarking process in accordance with one embodiment of the present invention.

To further describe the multi-stage watermarking process 2 in accordance with the illustrated embodiment of the present invention of FIG. 1, the discussion hereinbelow sets forth the present invention utilizing an object model syntax. In particular, FIG. 7 describes an embodiment of the present invention utilizing the Unified Modeling Language (UML) which is a general purpose notational language used by those skilled in the art to specify and visualize complex software. As can be seen in FIG. 7, the relevant outputs of the stages and the classes corresponding to the components thereof are illustrated in FIGS. 1-6 and have been recreated as an object model using the UML syntax. Correspondingly, the relevant outputs of the stages and the classes have been enumerated in FIG. 7 utilizing numerals of FIGS. 1-6 which have been increased by 100. It should also be noted that due to the length of the text in the object models, the term "watermark" is merely referred to as "mark" which as previously noted, refer to both watermarks and fingerprints. In addition, the term "specification" is merely referred to as "spec" whereas "technology" is sometimes referred to as "tech".

Accordingly, in FIG. 7, the watermark specification is represented by mark spec 112 while the template specification is represented as template spec 122. The mark spec 112 and template spec 122 represent the data and the actions that can be performed on the previously described watermark specification 12 and template specification 22 respectively. As can be seen, the mark spec 112 includes the classes content information 114, mark technology spec 116, and target object spec 118. In the illustrated embodiment, the mark spec 112 may utilize the mark technology 137 to generate the watermark. As can also be seen, the template spec 122 includes classes merge map 124, merge technology spec 126, and merge target spec 128. In the illustrated embodiment, the template spec 122 may utilize the merge technology 145 to properly merge the watermark into the target document to thereby provide a watermarked document. Thus, FIG. 7 clearly shows a representative relationship between the mark spec 112, the template spec 122, and the various classes thereof.

Figure 8:
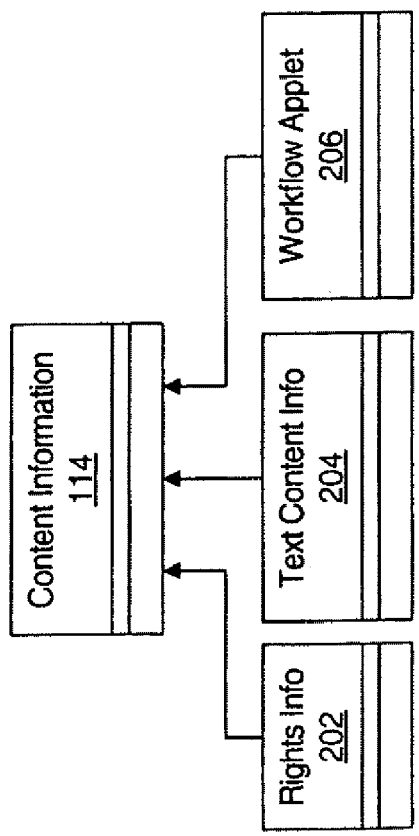
FIG. 8 is an object model illustration of a content information class in accordance with one embodiment of the present invention.

As shown in FIG. 8, the content information 114 may be subclassed into application specific objects. In the illustrated example, the content information 114 may include rights info 202, the text content info 204, and workflow applet 206 (i.e. a workflow processing application). The rights info 202 is content information that may include digital property rights information. The text content info 204 is an application that inserts straight text information into the watermark. The workflow applet 206 may represent the various applets that will be invoked during different stages of the document workflow. It should again be noted that the content information 114 is a representation of various application-specific content information 14 described previously and thus, it may vary depending on the specific application.

Figure 9:
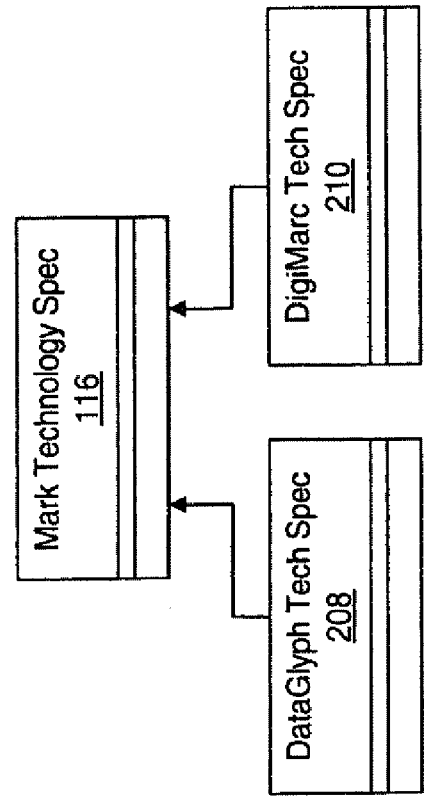
FIG. 9 is an object model illustration of a mark technology spec class in accordance with one embodiment of the present invention.
Figure 10:
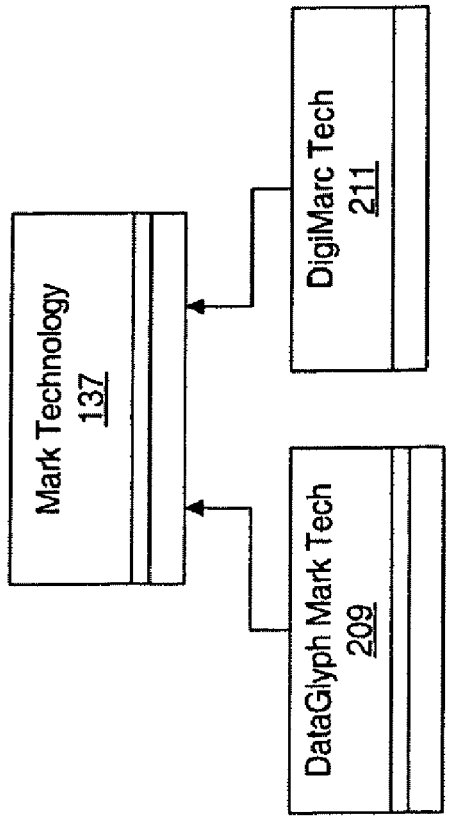
FIG. 10 is an object model illustration of a mark technology class in accordance with one embodiment of the present invention.

The mark technology spec 116, as shown in FIG. 9, and the mark technology 137, as shown in FIG. 10, represent various technologies that can be used in generating the watermark in accordance with the multi-stage watermarking process of the present invention. As can be seen in FIG. 9, the mark technology spec 116 may include the DataGlyph® tech spec 208 or the DigiMarc® tech spec 210 which correspond to Xerox® DataGlyph® and DigiMarc® technologies respectively that may be utilized to create the watermark specification 12 shown in FIG. 2. Similarly, as shown in FIG. 10, the mark technology 137 may utilize the DataGlyph® mark tech 209 or the DigiMarc® tech 211 to generate the desired watermarked object 32 shown in FIGS. 4A and 4B. Thus, with respect to FIGS. 9 and 10, two different watermark technologies are represented under the watermark specification creation 10 stage and the watermark generation 30 stage described previously of the multi-stage watermarking process in accordance with one embodiment of the present invention. It should also be noted that other watermark technologies may also be used in other embodiments of the present invention. As previously noted, such other technologies include Verance®'s Electronic DNA®, Alpha Tech®'s EIKONAmark®, Audiomark® and Videomark®, Blue Spike®, and IBM® applications, etc.

Figure 11:
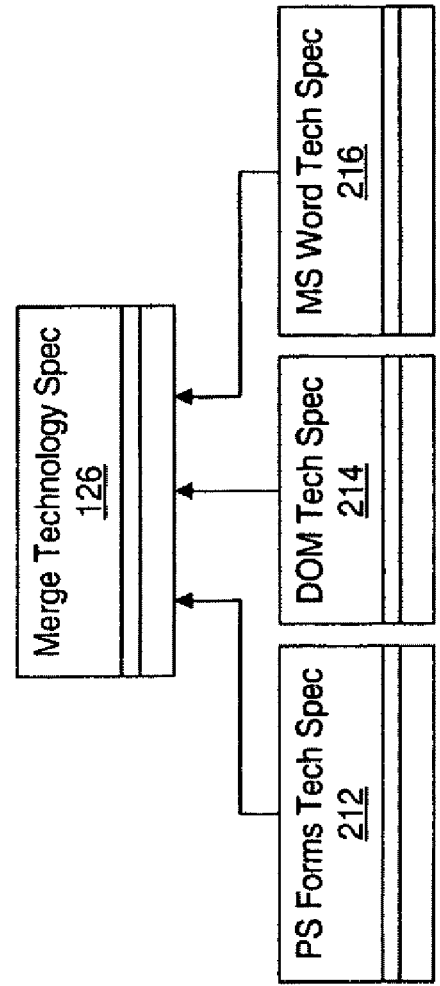
FIG. 11 is an object model illustration of a merge technology spec class in accordance with one embodiment of the present invention.
Figure 12:
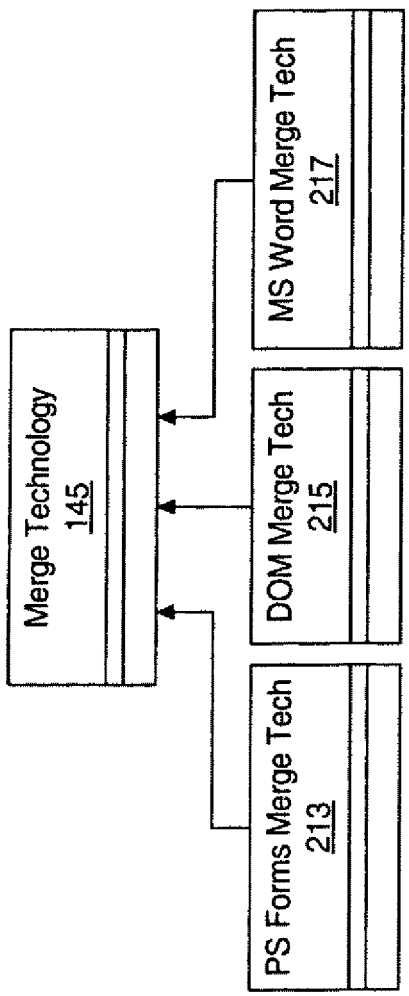
FIG. 12 is an object model illustration of a merge technology class in accordance with one embodiment of the present invention.

In a similar manner, the merge technology spec 126, and the merge technology 145 of FIGS. 11 and 12 represent the various merging technologies that can be used into merge the watermark into the target document in accordance with the present invention. In particular, as can be seen in FIG. 11, the merge technology spec 126 may include PostScript® PS forms tech spec 212, document object model (DOM) tech spec 214, or MS Office® tech spec 216 that may be used in the template specification generation 20 stage to generate the template specification 22 as shown in FIG. 3. In addition, as shown in FIG. 12, the merge technology 145 may include the PostScript® PS forms merge tech 213, document object model DOM merge tech 215, or MS Office® merge tech 217 that may be used in the watermark merging 40 stage in the manner shown in FIGS. 5A and 5B to thereby generate the watermarked document 42. Thus, with respect to FIGS. 11 and 12, two different merging technologies are represented for the template specification generation 20 stage and the watermark merging 40 stage described previously of the multi-stage watermarking process in accordance with one embodiment of the present invention. Of course, it should also be noted that other merging technology may be used instead of the ones discussed above.

It can be readily appreciated by one of ordinary skill in the art, the above described multi-stage watermarking process in accordance with the present invention attains the previously noted objectives by allowing digital watermarks to be specified, generated, and merged, into documents at different stages of the document life cycle. Thus, the present invention enables mixing of watermarking technologies within a given document, and enables support for various merging technologies, and also allows these stages to occur at different times and on different systems. The present invention also allows early binding of static information and late binding of dynamic information. The present invention further allows automatic watermarking of multiple documents with a single watermark specification, as well as watermarking a single document with multiple watermark specifications.

Example Applications

Figure 13:
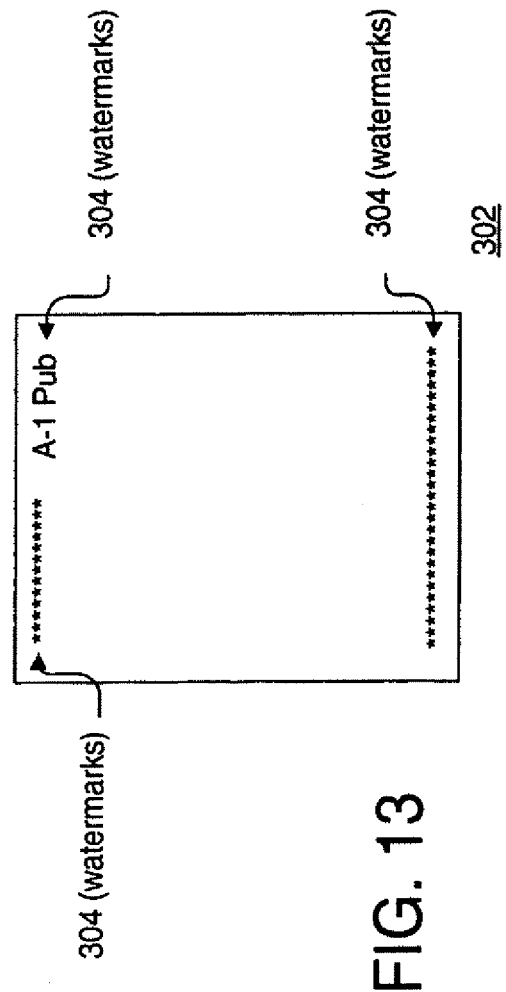
FIG. 13 is one example of a document with watermarks that were generated using the multi-state watermarking process of the present invention.
Figure 14:
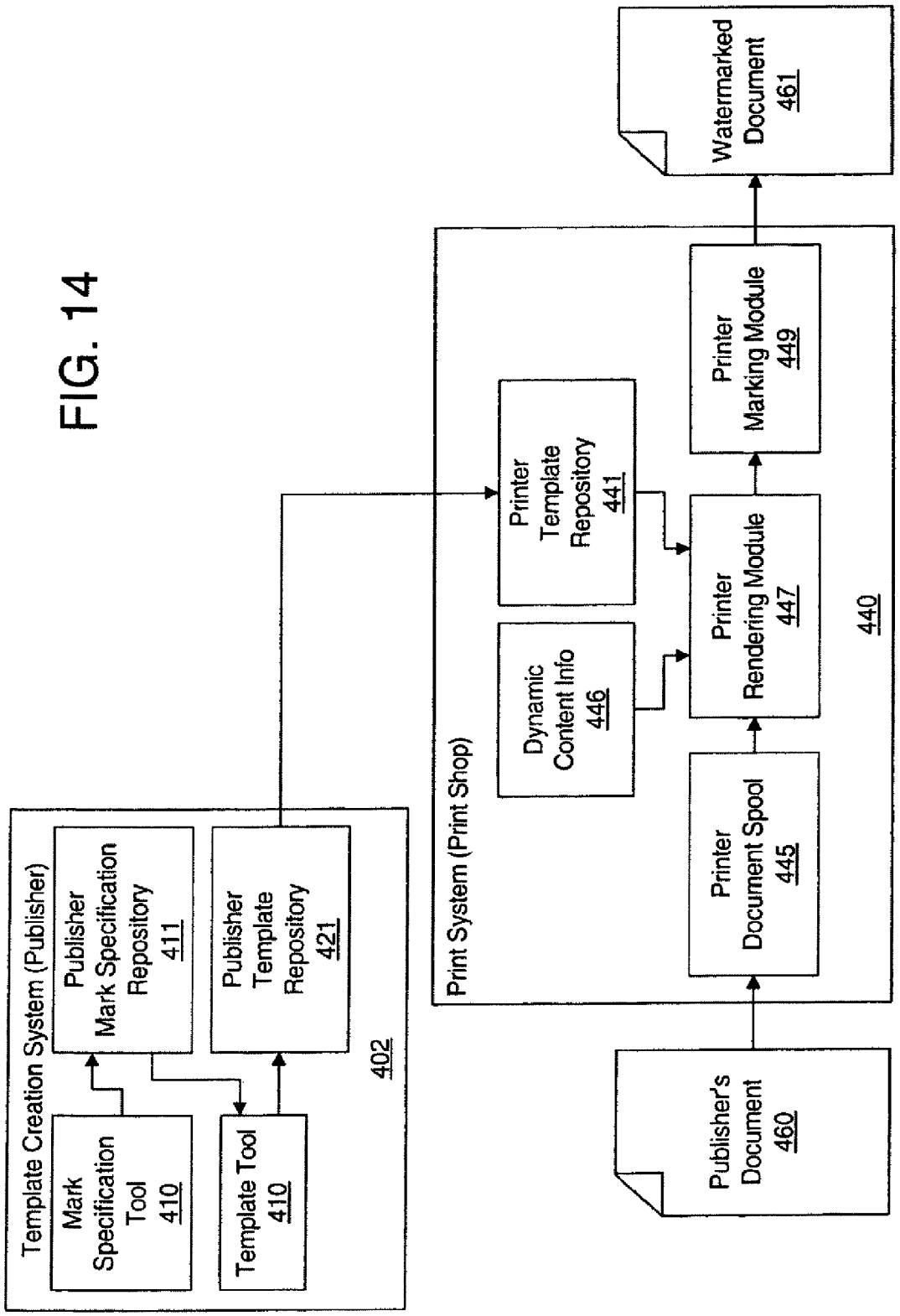
FIG. 14 is a schematic illustration of one application where the present invention may be effectively used.

FIG. 13 illustrates a watermark template 302 having various watermarks 304 generated in the manner described above which may be utilized in various applications, two of such applications being described in further detail hereinbelow which are made possible by the multi-stage watermarking process of the present invention. FIG. 14 illustrates one application for the multi-stage watermarking process in accordance with the present invention. In this application, a publisher utilizes a template creation system 402 described in further detail hereinbelow to sell digital documents that are to be printed by users at their local commercial print shops that utilize print system 404. To deter and/or detect illegal copying, the publisher desires to put standard watermarks for all of their documents printed at the commercial print shops. The publishing company creates a watermark template 302 of FIG. 13 or any other watermark template that includes a template specification described previously. The watermark template may specify several watermarked objects that are to appear on each printed document. For instance, the publisher may specify borders for its standard header and footer using DataGlyph watermarks. Of course, different sets of watermarks could be specified for the front cover and/or a dynamic information may be put into the watermarks in order to identify the various print shops. These templates can then be distributed to print shops that are authorized to print the publisher's documents. When the print shop prints the publisher's document, the print system 404 will follow the watermark template to render the correct watermarks on the specified pages.

More specifically, as can be seen in FIG. 14, the template creation system 402 used by the publisher includes a mark specification tool 410 and a template tool 420. The mark specification tool 410 enables the users to create watermark specification described previously, and stores it into the watermark specification repository 411. The publisher interacts with the template tool 420 to thereby create templates having template specifications described previously by using the watermark specification stored in the mark specification repository 411. The templates are then stored in the publisher template repository 421. These templates are subsequently stored in the printer template repository 441 of an authorized print shop. Any method can be used to transfer the templates from the publisher's template creation system 402 to the print shop's print system 440 including via a network such as the Internet, a secure network, or by physically transferring an information storage media such as an optical or magnetic disc with the templates thereon. The templates stored within the printer template repository 441 of the print system 440 may then be retrieved as needed by the print system 440. Of course, in other applications, the templates may also be provided together with the document to be printed.

When a publisher's document 460 is submitted to the print shop, the print system 440 spools the publisher's document 460 into the printer document spool 445. The print system 440 then searches the printer template repository 441 for the appropriate template to use. During rendering, the printer's rendering module 447 performs the watermark generation and watermark merging function described previously by generating the watermark, reading the template, and merging the watermark into the target document to thereby provide a watermarked document 461. The document may then be and printed by the printer marking module 449 and a hard copy may be outputted by the print system 440. Any dynamic content info 446 may be provided to the printer rendering module 447 so that such dynamic content info 446 can be placed into the watermark of the watermarked document 461 by the printer marking module 449. As previously explained, such dynamic content info 446 may be any information which was not readily available, for instance, the identity of the print shop or the identity of the person for whom the watermarked document 461 is provided.

Figure 15:
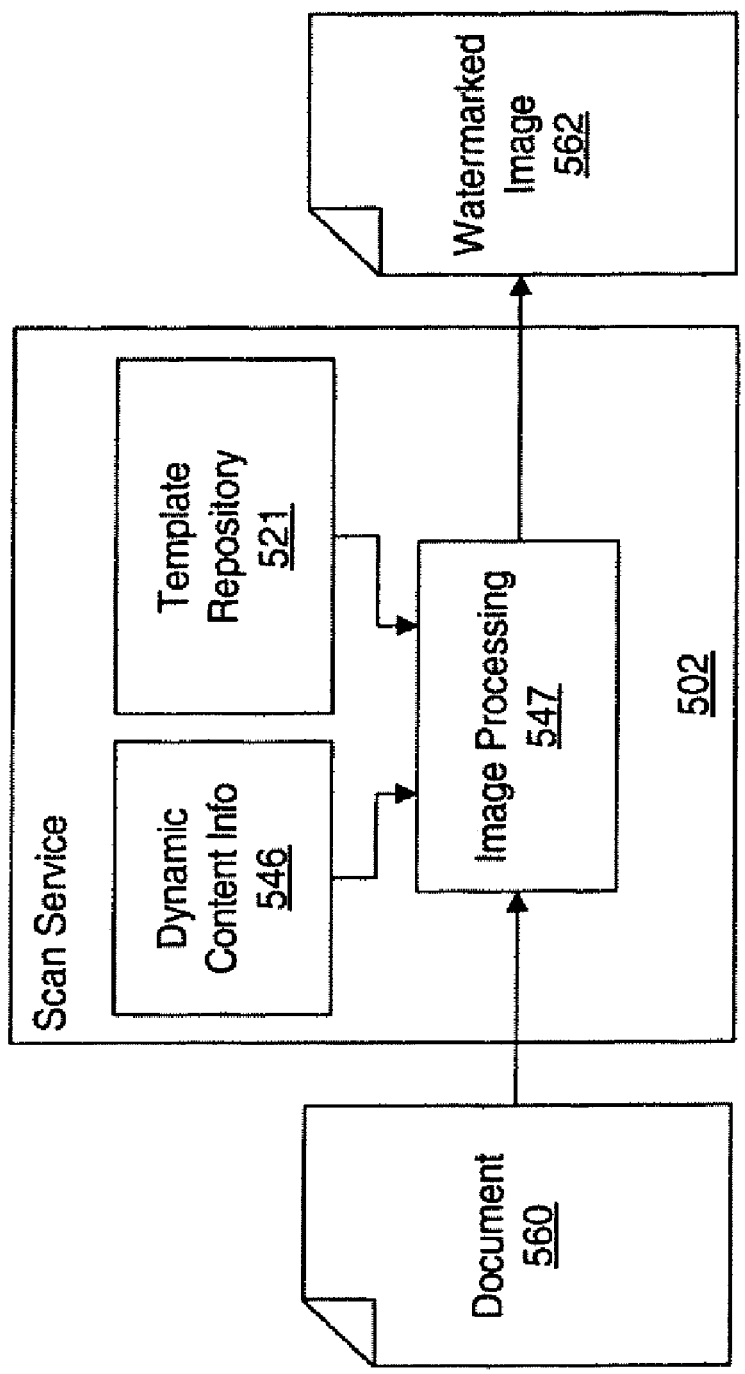
FIG. 15 is a schematic illustration of another application where the present invention may be effectively used.

FIG. 15 illustrates yet another application of the multi-stage watermarking process in accordance with the present invention. In this illustrated embodiment, the scan service 502 utilizes the multi-stage watermarking process to process various forms in the manner described below. The scan service 502 may be, for example, an insurance company which processes various types of claim forms or documents that are sent into the company via surface mail or fax. The scan service 502 scans in each form or document for record keeping purposes and inserts watermarks into the scanned image of each claim form or document in order to record various types of information such as the receipt date of the form and the status of the claim. Other information can of course, be provided in the watermark to facilitate workflow processing of the claim form. The scan service 502 may design different watermark templates for each type of claim form 560, each template being defined using a watermark specification to record the information in the appropriate format (for example, DataGlyph®), and a template specification in the manner described previously. For instance, the template specification may include a watermark to record the status of the claim as a text image in the background of the claim form image. This may be desirable to allow claims adjusters to process the claim forms manually.

Referring again to FIG. 15, when the claim form 560 is initially scanned in by the scan service 502, the scan service 502 performs the watermark recovery function corresponding to the watermark recovery 50 stage and looks for the form type which has been recorded in the DataGlyph format. The image processing system 547 then brings up the corresponding watermark template from the template repository 521 and puts the desired additional watermarks into the image. Moreover, dynamic content information 546 such as information regarding the current status of the claims may also be incorporated into the watermark. The image processing system 547 then performs the watermark generation and watermark merge functions described previously to render the watermarks into the image and output the watermarked image 562 which may then be sent to an appropriate repository for subsequent processing.

Watermark Specification Language

As previously noted, the present invention provides a multi-stage watermarking process 2 and a system such as a computer based system for executing such a process. In this regard, one embodiment of a watermark specification language (hereinafter "WSL" or "language") that may be used for defining the watermark specification 12 and template specification 22 discussed above is proposed herein below in detail. This embodiment of the watermark specification language is modeled from the Digital Property Rights Language (DPRL) developed by Mark Stefik et al. as fully described in detail in U.S. Pat. Nos. 5,629,980, and 5,715,403 which are incorporated herein by reference, as well as application Ser. No. 08/948,893 which was previously incorporated herein by reference. As such, the language grammar and grammar rules given below relative to the watermark specification language generally correspond to DPRL but the keywords and the syntax of the WSL differ from DPRL. It should also be noted that DPRL itself includes information which may be a component of the watermark specification. In particular, DPRL specifies the requirement for watermark from the rights perspective. For example, the publishers can specify what information is to be in the watermark. The WSL in accordance with the present invention also allows specification of how the watermark should be put into the document. In this sense, WSL enhances DPRL and may be used in conjunction with DPRL to define the watermark specification 12, or be used by itself. This is attained since the WSL also allows defining of the template specification 22 in accordance with the present invention as described previously. Of course, other languages may be utilized in practicing the present invention and the details set forth hereinbelow should be understood as merely showing one example. For example, the present invention may be practiced by utilizing a watermark specification language in the XML format or other derivations thereof.

Initially, it is noted that terms of the WSL in italics are expanded into other terms in the actual WSL specification, the specification referring to the watermark specification 12 and/or the template specification 22 in the present embodiment. Italicized terms that are to be expanded into other terms in the actual WSL statements are referred to as non-terminals, and terms that appear in actual WSL statements are referred to as terminals. The right arrow "->" indicates a grammar expansion rule. Thus, as an example, the rule:

a-spec->b: b-spec means that the non-terminal a-spec is expanded to "b:" followed by an expansion of b-spec. The subscript "opt" indicates that a specification is optional. Vertical bars "|" are used to indicate alternative expressions. For example, the rule b-spec->a|
   x (Goodies: b-list)$_{opt}$|
c: c-spec means that a b-spec is expanded into either an "a" or an "x" followed optionally by a parenthetical expression starting with "Goodies:" and followed by the expansion of b-list, or a "c:" followed by an expansion of c-spec.

In the embodiment below, the white space in the language such as spaces and tabs, is used merely to separate the grammar of the language and has no other meaning except inside quoted strings. The case of terms such as capitalization is also not meaningful. Thus, a "Template:" keyword can be written as "Template:" or "template:" or even "tEmPlaTe:". However, capitalizing the first letter is preferred for readability. Preferably, programs that print specifications out from objects utilize the preferential capitalization.

Some of the design goals for the grammar include:

Simple parsing. To arrange statements in uniform format to thereby simplify parsing.

Extensive defaulting. To provide a language with well-defined defaults when a particular parameter is not specifically given, especially since many parameters are optional.

Extensibility. To establish a language style in which it is easy to add new features unambiguously without substantially modifying the language or rewriting old specifications.

To this end, the grammar elements have the form:

(keyword: parameter$_1$ parameter$_2$)

that is, a keyword is followed by a colon, followed by a set of optional parameters. The language has many optional parameters and few position-sensitive parameters. The parameters themselves are recursively represented as further elements. This leads to sentences of the form:

(keyword$_1$: (keyword$_2$: parameter$_1$)
   (keyword$_3$: (keyword$_4$: parameter$_2$) (keyword$_5$: parameter$_3$)))

with short parenthesized elements whose meaning is easy to recognize. At the bottom, there are keyword-value pairs that describe particular parameter values.

In the examples below, the preferred order for key-word phrases is the order shown in the grammar. In many cases, this order is thought to be clearest in meaning. However, except as noted in the text, compilers and interpreters of the language preferably accept the phrases in other orders as well. Programs that generate statements in the language are expected to print out phrases in the preferred order.

Template Specification

The highest level grouping in the Watermark Specification Language (WSL) is template specification 22 (FIG. 3) which as been described previously above and may have the following grammar with the grammar elements:

watermark-template->
   (WMTemplate:
   (WSL-Version: version-id)
   (Template-ID: template-id)$_{opt}$
   (Name: text-description)$_{opt}$
   (Description: text-description)$_{opt}$
   (Owner: certificate-spec)$_{opt}$
   (Comment: comment-str)$_{opt}$
   watermark-list-spec
   map-list-spec)

The WSL-Version includes a grammar element which is a machine-readable identifier version-id that identifies the version of the watermark specification language used. The identification of the version of the WSL used facilitates backwards compatibility to works in which the template specification were written in an older version of the language.

As indicated by the subscript "opt", the grammar element template-id is an optional identification tag which can be used to identify the particular template. In this regard, the template-id may identify a digital certificate signed by a trusted registration authority that assigns a unique identification number to the template. It also may include information for locally detecting any changes or tampering with the template. In addition, the template-id may also include address information for locating a reference copy of the template.

The template specification 22 may also include optional grammar elements for a name and a description of the template. The format and scope of the information in the name and the description are not specified so that different parties can put various types of information here, depending on the application.

The template specification 22 may further include an optional grammar element for owner specification, which may indicate who is authorized to change any part of the template-specification, including adding or deleting watermarks and its associated parameters. The owner specification may also indicate what digital license is required to make the changes. If no owner specification is specified, then anyone (or no one) would be able to make changes to the watermarks in a digital work.

The template specification 22 may also include an optional grammar element for comments. Comments in WSL may be intended for documentation purposes and may be used by people creating and updating template specifications. Comments are not interpreted for meaning by watermarking systems but their provision and use is important in the WSL. More specifically, since WSL statements can be compiled into objects and subsequently printed out again to make new source statements, it is important that comments be preserved throughout the edit-compile-reprint cycle for specifying rights. In the WSL herein described, the comments have fixed and specific locations in the syntax ("structured comments") corresponding to structured locations for object storage to thereby ensure that the comments be stored in the compiled watermark objects. In this regard, there is preferably only one comment in a template specification at each level.

The watermark-list-spec in the template specification 22 preferably lists all of the watermark specifications that are used in the template and have the following grammar:

watermark-list-spec->(Watermark-List: watermark-list)
    watermark-list->wm-spec watermark-list$_{opt}$ A fuller description for the watermark-spec is provided in a later section hereinbelow.

The map-list-spec in the template specification 22 lists the descriptions of how each watermark should be merged within the document and have the following grammar:

map-list-spec->(Map-List: map-list)
    map-list->map-spec map-list$_{opt}$

A fuller description for the map-spec is also provided in a later section hereinbelow.

An example template specification 22 is given below:

```
(WMTemplate:
    (WSL-Version: 1.01)
    (Template-ID: "Journal-Press-Registry-kjru89902)
    (Name: "standard-journal-page")
    (Description: "Template for page for standard journal cover page")
    (Owner: (Certificate:
        (Authority: "Journal Publishers Association")
        (ID: "Journal Press Publishing")))
    (Comment: "To be included in all journal cover sheet")
    (Watermark-List:
        (WMSpec: (
            (Name: "DataGlyph 1X6")
            (WMSpec-ID: "JPP-1278"
            (WMContentInfo.RightsContentInfo:
                (Label-ID: JPA223049-01))
```

-continued

```
            (WMTechInfo.XDGTechInfo:...)
            (WMTargetInfo:...))
        (WMSpec: (
            (Name: "Copyright Notice")
            (WMSpec-ID: "JPP-748922"
            (WMContentInfo.NullContentInfo: )))
    )
    (Map-List:
        (WMMap: (
            (WMSpec-ID: "JPP-1278")
            (WMPosition.PageCoord: 1 50 125)))
        (WMMap: (
            (WMSpec-ID: "JPP-748922")
            (WMPosition.PageCoord: 2, 350 250)))
    )
)
```

Watermark Specification

Watermark specification 12 (FIG. 2) defines how the watermark is to be generated, what information is to be in the watermark, and what technology is to be used in generating the watermark. It contains information on the content (such as content information 14), the technology to use (such as mark technology specification 16), and the target object (target object specification 18) into which the watermark is to be placed. It should be noted that the watermark specification 12 can exist independent of the template specification 22 described previously and has the following grammar with the grammar elements:

wm-spec->
        (WMSpec:
        (WSL-Version: version-id)$_{opt}$
        (Name: name-str)$_{opt}$
        (WMSpec-ID: wm-speci-id)
        content-info-list$_{opt}$
        tech-info-spec
        target-info-spec The WSL-Version includes a grammar element which is a machine-readable identifier version-id that identifies the version of the watermark specification language used. The identification of the version of the WSL used facilitates backwards compatibility to works in which the watermark specification were written in an older version of the language. The provision of the version-id is optional for the watermark specification 12 if the watermark specification 12 is actually a part of the template specification 22, and if the version of the language happens to be the same. Each watermark specification 12 may have an optional grammar element for a name:

Name: name-str

The watermark specification 12 also includes a grammar element wm-spec-id which is an identification tag used to identify the watermark specification 12. This is preferably provided since each watermark map-spec appearing in the template specification 22 refers to a watermark specification 12 using the wm-spec-id.

As previously noted, there are preferably three main components to the watermark specification 12: the content information 14, the mark technology specification 16, and the target object specification 18 which are shown in FIG. 2. As previously described, the content information 14 indicates what information should be in the watermark. In many cases, the content information 14 is application specific. For example, a rights management application may specify rights-related information to be in the watermark whereas a workflow application may specify other types of information to be in the watermark. Therefore, the parameters for the content information 14 is preferably specific to the application and in the present embodiment, has the following grammar:

content-info-list->content-info-spec content-info-list$_{opt}$
content-info-spec->(WMContentInfo.content-info-qualifier:
  application-id-spec$_{opt}$
  content-info-parameters)
application-id-spec->Appl-ID: application-id The grammar element content-info-qualifier specifies the particular application and thus, the content-info-spec, for example, may be:
(WMContentInfo.RightsContentInfo: (Label-ID: 25.457/12546))
where the RightsContentInfo is the application and the Label-ID is the parameter specific to the application.

The grammar element application-id is an optional identification tag in the watermark to help identify the particular application associated with the content so as to aid in associating the application with the content when the watermark is recovered.

The mark technology specification 16 describes a specific watermarking technology, with associated parameters, to use in creating or interpreting the watermark. Thus, the specification is closely related to the specific technology selected. For example, an application involving DataGlyphs® may require error correction parameters, whereas one involving DigiMarc® may us some other particular information. Because of this specificity, the technology information parameters in the language may depend on the technology actually being used.

tech-info-spec->
  (WMTechInfo.technology-info-qualifier: technology-info-parameters)

Here the grammar element technology-info-qualifier identifies the specific technology involved and the technology-info-parameters provide the necessary parameters for that technology. For example, the tech-info for DataGlyphs may be:
(WMTechInfo.XDGTechInfo: (Error-correction: 20)
  (Write-white: false))

The target object specification 18 describes the target object into which the watermark is to be placed and may have the grammar:
target-info->(WMTargetInfo.target-info-qualifier.target-info-parameters)

This specification is loosely related to the watermarking technology and the content information. For instance, it isn't meaningful to specify a JPEG image as the target object if the technology is specified as DataGlyphs®. In the above noted grammar, the target-info-qualifier is specific to the type of the target. For example, if the technology selected is DataGlyphs®, the target-info may be:
(WMTargetInfo.XDGTargetInfo:
  (XDGWidth: 16)
  (XDGHeight: 16)
  XDGFileType: BMP))

Lastly, referring again to the map-spec previously noted relative to the template specification 22 discussed above, the map-spec defines how the watermark is to be merged into the document and may have the grammar with the grammar elements:
map-spec->
  (WMMap:
    (Wmspec-Id: wm-spec-id)
    wm-pos-spec)

The grammar element wm-spec-id is an identification tag which may be used to identify the corresponding watermark specification 12 and is assumed to be in the template specification itself, or otherwise be available to the application that processes the template specification. The map-spec and the positional information therein, indicates the specifics of where the watermark should appear in the target document. In many cases, the positional information is specific to a target object. For example, if the target object is a document formatted for printing, the positional information may be in terms of pages and the x/y coordinates within a page. Positional information may also point to some object in the document. If the target object is a video or audio clip, the positional information could be quite different (e.g., with time element). In any case, the grammar element wm-pos-spec may be:
wm-pos-spec->(WMPosition.position-qualifier: position-vector)
position-vector->position-element position-element-vector$_{opt}$ The position specification is preferably in a form of a vector representing the hierarchy of positional elements, with each successive element defining the position in more detail. For example, position specification for a document might have section, chapter, page and x/y position in the vector, in that order. The position-qualifier specifies the particular type of position specification. For example, the wm-pos-spec may be:
(WMPosition.PageCoord: 1 546 785)

The type and the order of individual elements in the position-vector are specific to the type of the position specification as indicated by the position-qualifier. In the example above, the PageCoord qualifier identifies the page number and the x/y coordinates within the specified page. There may be other page based qualifiers that describe in different forms, the page designation (e.g., first page, last page, etc.). Each position-element itself could also be of the "(a: param)" form, depending on the type of the position element that the position vector requires.

It should be evident from the above detailed discussions that by providing a multi-stage water marking process, the present invention allows the creation of a watermark specification, and the actual generation of the watermark, to occur at different stages of the watermarking process. It should also be evident how the present invention allows the generation and merging of the watermark into the document to occur at different stages in the watermarking process. It is further evident how the present invention allows the creation of template specification and the actual merging of the watermark into the document to occur in different stages within the watermarking process. As explained above, these provisions allow early binding of static information and late binding of dynamic information. The present invention further allows automatic watermarking of multiple documents with a single watermark specification, as well as watermarking a single document with multiple watermark specifications. Moreover, it should also be evident how the present invention allows the support of multiple watermarking and merging technologies so that it will allow various watermarking technologies to be used within a document.

It should also be noted that the present invention can be embodied as software, hardware, or combination thereof. For instance, the present invention may be implemented utilizing any type of hardware or combination thereof such as various "clients" and "servers". Accordingly, the terms "client" and "server" as used herein, can refer to any type of computing device or data terminal, such as personal computer, a portable computer, a dumb terminal, a thin client, a hand held device, a wireless phone, or any combination of such devices. The various clients and servers can be a single computer at a single location or multiple computers at single or multiple locations. For example, a server may be comprised of a plurality of redundant computers disposed in co-location facilities or at various locations to facilitate scalability. There can be any number of clients and any number of servers and the client can also be physically located on the same hardware as the server.

Moreover, the present invention can be implemented over any type of communications network, such as the Internet, a local area network (LAN), a wide area network (WAN), direct computer connections, or the like using any type of communications hardware and protocol. Communication can be accomplished over electric cable, fiber optic cable, or any other cable, or in a wireless manner using radio frequency, infrared, or other technologies. As previously noted, documents can be of any type and contain any type of content such as text, audio information, video information, or any combinations thereof.

It should also be noted that whereas the multi-stage watermarking process in accordance with the present invention is described as having multiple stages, it should be appreciated that these stages need not be embodied in separate software or hardware but may be provided in a single software or hardware. Moreover, it should also be apparent that the various stages of the present embodiment as discussed above can be subdivided into small stages and other stages may be added as well. In this regard, if the present invention is implemented in software, the various steps can be merely separate portions of the same software code, different files, interspersed lines of code, etc.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications which are encompassed by the claims.

What is claimed is:

1. A method for creating a watermark in a target document at different stages of the target document life cycle, the method comprising:
    scanning the target document containing a target watermark;
    recovering the target watermark from the target document, the recovered target watermark indicating a template specification for describing how the watermark was merged into the target document;
    generating an additional watermark according to a watermark specification;
    updating the template specification by adding the watermark specification and associating the additional watermark with the watermark specification in the template specification; and
    merging the generated watermark with the scanned target document.

2. The method of claim 1, wherein the template specification identifies at least one watermark specification and provides a mapping list of how the at least one watermark associated with at least one watermark specification is merged, the at least one watermark specification identifying a specific watermarking technology and a target object in which the watermark is generated.

3. The method of claim 1, wherein the additional watermark includes dynamic information pertaining to different stages of the life cycle of the target document.

4. The method of claim 1, wherein the target watermark has a dataglyph format indicating a form type associated with the template specification.

5. The method of claim 1, wherein the target document comprises audio or video.

6. The method of claim 1, further comprising removing the target watermark from the target document.

7. The method of claim 1, wherein the additional watermark is generated based on the target watermark.

8. A watermarking system comprising:
    a target document including a target watermark;
    a scan service for scanning the target document;
    a watermark recovery module for recovering the target watermark from the scanned target document, the recovered target watermark indicating a template specification for describing how the watermark was merged into the target document; and
    a watermark processing module for generating an additional watermark according to a watermark specification, the watermark processing module updating the template specification by adding the watermark specification and associating the additional watermark with the watermark specification in the template specification, the watermark processing module for merging the generated additional watermark with the scanned document.

9. The system of claim 8, wherein the template specification identifies at least one watermark specification and provides a mapping list of how the at least one watermark associated with at least one watermark specification is merged, the at least one watermark specification identifying a specific watermarking technology and a target object in which the watermark is generated.

10. The system of claim 8, wherein the additional watermark includes dynamic information pertaining to different stages of the life cycle of the target document.

11. The system of claim 8, wherein the target watermark has a dataglyph format indicating a form type associated with the template specification.

12. The system of claim 8, wherein the target document comprises audio or video.

13. The system of claim 8, the watermark processing module further removing the target watermark from the target document.

14. The system of claim 8, wherein the additional watermark is generated based on the target watermark.

15. The system of claim 8, wherein the watermark processing module is an image processing system.

16. A method for creating a watermark in a target document at different stages of the target document life cycle, the method comprising:
    recovering a target watermark from the target document, the recovered target watermark indicating a template specification for describing how the watermark was merged into the target document;
    generating an additional watermark according to a watermark specification;
    updating the template specification by adding the watermark specification and associating the additional watermark with the watermark specification in the template specification; and
    merging the generated watermark with the scanned target document.

17. The method of claim 16, wherein the template specification identifies at least one watermark specification and provides a mapping list of how the at least one watermark associated with at least one watermark specification is merged, the at least one watermark specification identifying a specific watermarking technology and a target object in which the watermark is generated.

18. The method of claim 16, wherein the additional watermark includes dynamic information pertaining to different stages of the life cycle of the target document.

19. The method of claim 16, further comprising removing the target watermark from the target document.

20. The method of claim 16, wherein the additional watermark is generated based on the target watermark.

* * * * *